United States Patent
Okubo et al.

(10) Patent No.: US 7,961,871 B2
(45) Date of Patent: Jun. 14, 2011

(54) ENCRYPTION PROCESS, ENCRYPTION DEVICE, AND COMPUTER-READABLE MEDIUM STORING ENCRYPTION PROGRAM

(75) Inventors: Shigeyuki Okubo, Yokohama (JP); Ryota Akiyama, Suginami (JP)

(73) Assignee: Fujitsu Broad Solution & Consulting Inc., Tokyo (JP)

( * ) Notice: Subject to any disclaimer, the term of this patent is extended or adjusted under 35 U.S.C. 154(b) by 916 days.

(21) Appl. No.: 11/907,287

(22) Filed: Oct. 10, 2007

(65) Prior Publication Data

US 2008/0144809 A1 Jun. 19, 2008

(30) Foreign Application Priority Data

Dec. 19, 2006 (JP) .................................. 2006-340627

(51) Int. Cl.
*H04L 9/28* (2006.01)
*H04K 1/00* (2006.01)
(52) U.S. Cl. .......................................... 380/28; 380/37
(58) Field of Classification Search .................... 380/28, 380/37
See application file for complete search history.

(56) References Cited

U.S. PATENT DOCUMENTS

| 2004/0172543 A1* | 9/2004 | Sato et al. ...................... 713/187 |
| 2007/0064946 A1* | 3/2007 | Ohkubo et al. ................ 380/267 |
| 2007/0237326 A1* | 10/2007 | Nonaka et al. .................. 380/37 |

OTHER PUBLICATIONS

Patent Abstracts of Japan, Japanese Publication No. 8-227269, published Sep. 3, 1996, Inventor: Iwayama Noboru, et al.; *Abstract Only* (1pg).

* cited by examiner

*Primary Examiner* — Michael Pyzocha
(74) *Attorney, Agent, or Firm* — Staas & Halsey LLP

(57) ABSTRACT

A process, a device, and a computer-readable medium storing a program, for encryption. A conversion table having regions each of which stores $2^i$ character codes associated with index values is provided, where i is a natural number predetermined for each region, the $2^i$ character codes are defined in a predetermined character encoding scheme, and the index values have a minimum necessary bit length for uniquely identifying the $2^i$ character codes within each region. First character codes constituting a plaintext are converted into index values by reference to respectively corresponding regions of the conversion table. Then, the index values are encrypted without changing the bit lengths, and the encrypted values are converted into second character codes associated with index values identical to the encrypted values by reference to the respectively corresponding regions of the conversion table, a sequence of the second character codes is outputted as an encrypted text.

7 Claims, 17 Drawing Sheets

| CONVERSION TABLE | | 133a |
|---|---|---|
| INDEX | CHARACTER CODE | NUMBER OF VALID BITS |
| 00000 (0) | 0x45 (E) | 4 |
| 00001 (1) | 0x54 (T) | |
| 00010 (2) | 0x41 (A) | |
| ⋮ | ⋮ | |
| 01111 (15) | 0x57 (W) | |
| 10000 (16) | 0x59 (Y) | 3 |
| 10001 (17) | 0x47 (G) | |
| ⋮ | ⋮ | |
| 10111 (23) | 0x4A (J) | |
| 11000 (24) | 0x51 (Q) | 1 |
| 11001 (25) | 0x5A (Z) | |

FIG. 5

ENCRYPTION PROCESS, ENCRYPTION DEVICE, AND COMPUTER-READABLE MEDIUM STORING ENCRYPTION PROGRAM

CROSS-REFERENCE TO RELATED APPLICATIONS

This application is based upon and claims the benefits of priority from the prior Japanese Patent Application No. 2006-340627, filed on Dec. 19, 2006, the entire contents of which are incorporated herein by reference.

BACKGROUND OF THE INVENTION

1. Field of the Invention

The present invention relates to an encryption process and an encryption device for encrypting character data on a character-by-character basis and a computer-readable medium storing an encryption program for encrypting character data on a character-by-character basis.

2. Description of the Related Art

Currently, the encryption technology is widely used for maintaining the confidentiality of transmitted information or stored data. The encryption methods include two types, the public-key encryption and the private-key encryption. The public-key encryption uses a pair of keys, a public key and a private key, which are used for encryption and decryption, respectively. The public-key encryption is advantageous in easiness of maintaining the encryption strength. In the private-key encryption (symmetric key encryption), a common key is shared by an encryptor and a decryptor, and used in both of encryption and decryption. The private-key encryption is advantageous in requiring smaller amounts of processing than the public-key encryption. When transmission of a great amount of data is necessary, the private-key encryption (requiring smaller amounts of processing) is generally used. The known encryption algorithms for the private-key encryption include DES (Data Encryption Standard) and AES (Advanced Encryption Standard). See, for example, Japanese Unexamined Patent Publication No. 8-227269.

Incidentally, in many cases of encryption using a computer, character data which are produced by encoding characters in accordance with a specific character encoding scheme are required to be encrypted. However, in some cases, data produced by encryption in accordance with a conventional encryption algorithm cannot be correctly handled by software which is designed to handle only character data (data represented by character codes assigned to characters), for the following reasons.

Most of the character encoding schemes have a range of character codes which are not assigned to any character. For example, in the Japanese-character encoding schemes such as shift_JIS (Japanese Industrial Standard JIS X 0208, Appendix 1), each character is represented by 16 bits, and part of the $2^{16}$ (=65,536) character codes are not assigned to a character. Therefore, the software can determine whether or not each character code represents a character, on the basis of whether or not a bit sequence of one of the unused character codes is detected. However, the encrypted data produced by encrypting inputted character data (character codes assigned to characters) in accordance with the conventional encryption algorithms extend over all the character codes which can be represented by the possible bit sequences having the same lengths as the inputted character codes. Thus, the software which is designed to handle only the character data (character codes assigned to characters) cannot correctly recognize the above encrypted data.

Even in the above circumstances, there are demands for handling encrypted data by software. Therefore, techniques for producing encrypted data which are represented by only the character codes assigned to characters are currently being studied. For example, a technique for converting encrypted data (produced in accordance with an encryption algorithm) into a character code by using the Base64 encoding scheme is known. In the Base64 encoding, first, original data is divided into 24-bit sections, and each 24-bit section is converted into four character codes each representing an en-width character (ASCII codes). According to this technique, it is possible to produce encrypted data which is represented by only ASCII codes, so that a greater number of software programs are allowed to handle the encrypted data.

However, according to the technique of producing encrypted data by use of the Base64 encoding scheme, the bit length of the encrypted data becomes greater than the bit length of the original character data. Since each 24-bit (3-byte) section is converted into four ASCII codes (each having the length of 4 bytes), the Base64 encoding increases the bit length by the factor of approximately 1.3. The increase in the bit length is particularly problematic when the encrypted data is stored in a database, since the size of data stored in a database is limited to a certain extent in many cases.

In addition, conversion of the bit length before or after the encryption may be considered as another technique for limiting the range of values which the encrypted data can have. Specifically, the original character code of each character is converted into a bit sequence having a shorter bit length than the original character code before the encryption. Then, the converted bit sequence is encrypted, and the encrypted bit sequence is inversely converted into a character code. For example, all the level-1 and level-2 kanji characters (according to JIS X 0208) can be represented by 13 bits. Therefore, encryption of the level-1 and level-2 kanji characters is performed after the 16-bit character codes are converted into 13-bit sequences. Thus, it is possible to limit the range of values which the encrypted data can have, while the finally obtained encrypted data are represented by 16-bit character codes (i.e., the bit lengths of the finally obtained encrypted data and the original character data can be equalized).

Nevertheless, in the case where the number of the character codes which are defined in a character encoding scheme is not equal to $2^n$ (where n is a natural number), and only the above technique for limiting the range of values is used, it is impossible to produce encrypted data which are represented by only the character codes. This is because the encryption can produce a bit sequence which cannot be inversely converted. For example, although the number of the level-1 and level-2 kanji characters according to JIS X 0208 is 6,879, the 13-bit sequences can represent 8,192 characters. Therefore, there is a possibility that even when the bit length is reduced to 13 bits, the encryption can produce a bit sequence to which no character is assigned. However, when the bit length is reduced to 12 bits, it is impossible to represent all the level-1 and level-2 kanji characters.

SUMMARY OF THE INVENTION

The present invention is made in view of the above problems, and the first object of the present invention is to provide an encryption process and an encryption device which encrypt character data on a character-by-character basis, and can readily produce encrypted data so that the encrypted data are represented by only character codes assigned to characters defined in a character encoding scheme, regardless of the number of the character codes assigned to the characters defined in the character encoding scheme.

In addition, the second object of the present invention is to provide a computer-readable medium storing an encryption program which realizes the above encryption device in a computer.

In order to accomplish the first object, according to the first aspect of the present invention, a encryption process is provided. The encryption process is characterized by comprising the steps of: (a) storing, in advance in a conversion-table storage unit, a conversion table having a plurality of regions each of which stores $2^i$ character codes associated with index values, where i is a natural number predetermined for each of the plurality of regions, the $2^i$ character codes are defined in a predetermined character encoding scheme, and the index values have a minimum necessary bit length for uniquely identifying the $2^i$ character codes within each of the plurality of regions; (b) acquiring a plaintext inputted into the computer, and converting first character codes constituting the plaintext into index values associated with the first character codes, respectively, by reference to ones, storing the first character codes, of the plurality of regions of the conversion table stored in the conversion-table storage unit, where the first character codes are defined in the predetermined character encoding scheme; (c) successively acquiring the index values, and encrypting the index values into encrypted values having respectively identical bit lengths to the index values; and (d) successively acquiring the encrypted values, converting the encrypted values into second character codes respectively associated with index values identical to the encrypted values by reference to the ones of the plurality of regions of the conversion table, producing a sequence of the second character codes as an encrypted text corresponding to the plaintext, and outputting the encrypted text.

In addition, in order to accomplish the first object, according to the second aspect of the present invention, an encryption device is also provided. The encryption device is characterized by comprising: a conversion-table storage unit which stores a conversion table having a plurality of regions each of which stores $2^i$ character codes associated with index values, where i is a natural number predetermined for each of the plurality of regions, the $2^i$ character codes are defined in a predetermined character encoding scheme, and the index values have a minimum necessary bit length for uniquely identifying the $2^i$ character codes within each of the plurality of regions; a plaintext conversion unit which acquires a plaintext inputted into the computer, and converts first character codes constituting the plaintext into index values associated with the first character codes, respectively, by reference to ones, storing the first character codes, of the plurality of regions of the conversion table stored in the conversion-table storage unit, where the first character codes are defined in the predetermined character encoding scheme; an encryption unit which successively acquires the index values, and encrypts the index values into encrypted values having respectively identical bit lengths to the index values; and an encrypted-text output unit which successively acquires the encrypted values, converts the encrypted values into second character codes respectively associated with index values identical to the encrypted values by reference to the ones of the plurality of regions of the conversion table, produces a sequence of the second character codes as an encrypted text corresponding to the plaintext, and outputs the encrypted text.

In order to accomplish the second object, a computer-readable medium storing an encryption program which realizes the above encryption device according to the second aspect of the present invention in a computer is provided.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 5 is a diagram illustrating an example of a data structure of a conversion table.

DESCRIPTION OF THE PREFERRED EMBODIMENTS

Embodiments of the present invention are explained below with reference to drawings, wherein like reference numbers refer to like elements throughout.

1. Outline of the Present Invention

Figure 1:
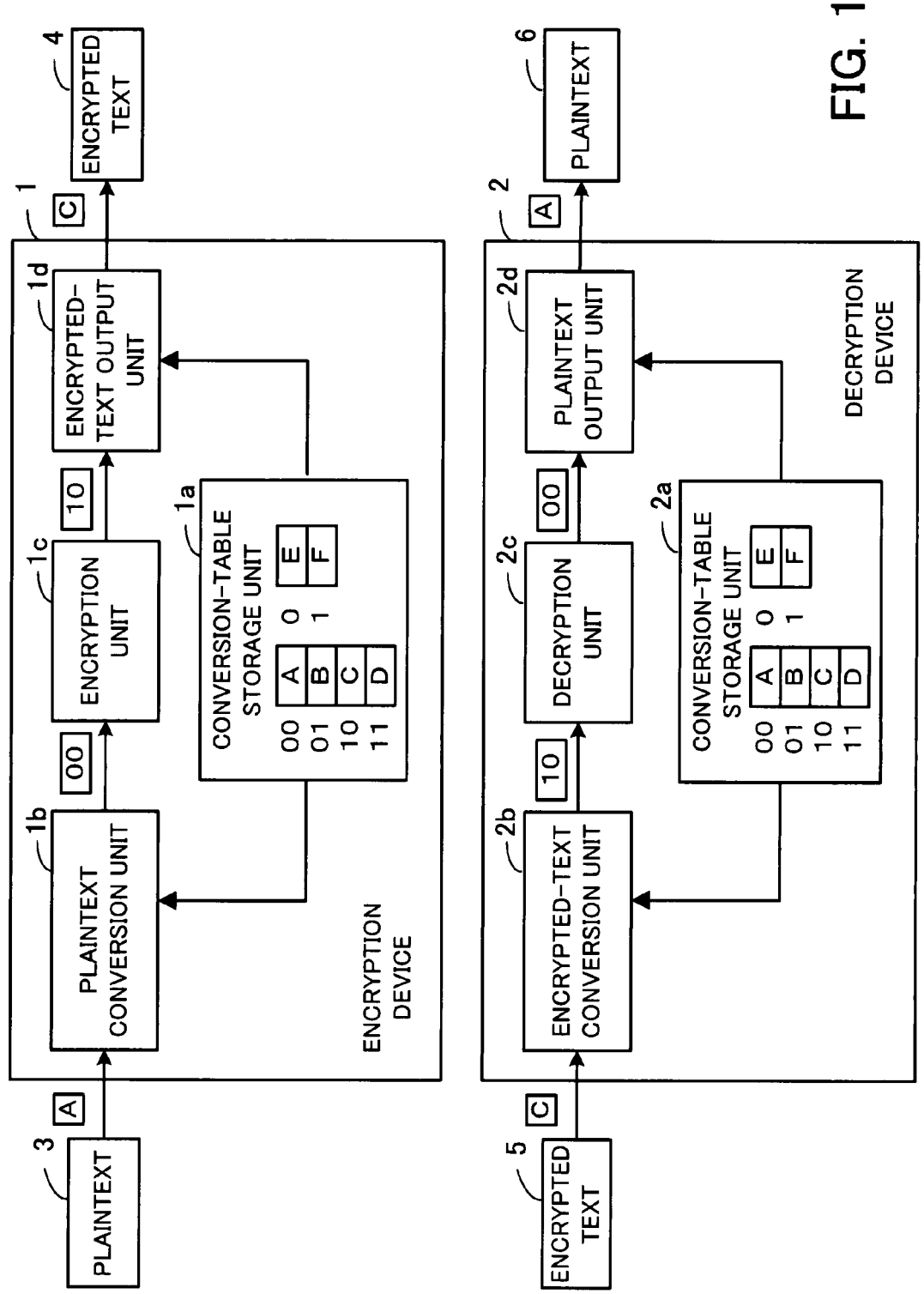
FIG. 1 is a diagram illustrating an outline of the present invention.

FIG. 1 is a diagram illustrating an outline of the present invention. As shown in FIG. 1, an encryption device 1 encrypts a plaintext 3 and outputs an encrypted text 4. On the other hand, a decryption device decrypts an encrypted text 5 created by the encryption device 1 and outputs a plaintext 6.

The encryption device 1 comprises a conversion-table storage unit 1a, a plaintext conversion unit 1b, an encryption unit 1c, and an encrypted-text output unit 1d.

The conversion-table storage unit 1a stores a conversion table, in which character codes defined in a predetermined character encoding scheme are associated with index values. The conversion table is divided into a plurality of regions so that $2^i$ character codes can be stored in each of the plurality of regions, where i is a natural number. Each index value is a bit sequence which uniquely identifies a character code in each of the plurality of regions. Each index value has a minimum necessary length for identifying a character code.

For example, consider a character encoding scheme in which six characters "A" to "F" are defined. Although the number "6" is not equal to $2^n$, the number "6" is the sum of $2^2$ and $2^1$. Therefore, the conversion table is divided into a first region for storing four ($2^2$) character codes and a second region for storing two ($2^1$) character codes. A two-bit index value is attached to each character code in the first region, and a one-bit index value is attached to each character code in the second region.

The plaintext conversion unit 1b acquires a plaintext 3 inputted into the encryption device 1, and converts each character code constituting the acquired plaintext 3 into an index value by reference to the conversion table stored in the conversion-table storage unit 1a. For example, when the plaintext 3 contains the character code of the character "A," the plaintext conversion unit 1b converts the character code into the index value "00."

The encryption unit 1c successively acquires index values produced by the plaintext conversion unit 1b, and encrypts each of the acquired index values into an encrypted value having the same length as the acquired index value. For example, the encryption unit 1c encrypts an index value "00" into an encrypted value "10."

The encrypted-text output unit 1d successively acquires the encrypted values which are produced by the encryption by the encryption unit 1c, and converts each of the acquired, encrypted values into a character code by reference to the conversion table stored in the conversion-table storage unit 1a. For example, the encrypted-text output unit 1d converts an encrypted value "10" into a character code "C." Thereafter, the encrypted-text output unit 1d outputs the sequence of the character codes obtained as above, as an encrypted text 4 corresponding to the plaintext 3.

The decryption device 2 comprises a conversion-table storage unit 2a, an encrypted-text conversion unit 2b, a decryption unit 2c, and a plaintext output unit 2d. The conversion table stored in the conversion-table storage unit 2a is identical to the conversion table stored in the conversion-table storage unit 1a.

The encrypted-text conversion unit 2b acquires an encrypted text 5, which is inputted into the decryption device 2, and converts each character code constituting the acquired encrypted text 5 into an index value by reference to the conversion table stored in the conversion-table storage unit 2a. For example, when the encrypted text 5 contains the character code of the character "C," the encrypted-text conversion unit 2b converts the character code into the index value "10."

The decryption unit 2c successively acquires the index values which are produced by the encrypted-text conversion unit 2b, and decrypts each of the acquired index values into a decrypted value having the same length as the acquired index value. For example, the decryption unit 2c decrypts an index value "10" into a decrypted value "00."

The plaintext output unit 2d successively acquires the decrypted values which are produced by the decryption unit 2c, and converts each of the acquired, decrypted values into a character code by reference to the conversion table stored in the conversion-table storage unit 2a. For example, the plaintext output unit 2d converts a decrypted value "00" into a character code "A." Thereafter, the plaintext output unit 2d outputs the sequence of the character codes obtained as above, as a plaintext 6 corresponding to the encrypted text 5.

Alternatively, it is possible to store the conversion table in a storage unit which can be referred to commonly from both of the encryption device 1 and the decryption device 2, instead of storing the conversion table in each of the encryption device 1 and the decryption device 2.

When a plaintext 3 is inputted into the encryption device 1 having the construction explained above, the plaintext conversion unit 1b converts each character code constituting the plaintext 3 into an index value having a bit length corresponding to the region storing the character code, on the basis of the information in the conversion table (having the plurality of regions in each of which $2^i$ character codes are stored, where i is a natural number). Then, the encryption unit 1c encrypts each index values into an encrypted value without changing the bit length. Finally, the encrypted-text output unit 1d converts the encrypted values into character codes by reference to the conversion table, and outputs the sequence of the character codes as the encrypted text 4.

In addition, when an encrypted text 5 is inputted into the decryption device 2 having the construction explained above, the encrypted-text conversion unit 2b converts each character code constituting the encrypted text 5 into an index value having a bit length corresponding to the region storing the character code, on the basis of the information in the conversion table (having the plurality of regions in each of which $2^i$ character codes are stored, where i is a natural number). Then, the decryption unit 2c decrypts each index values into a decrypted value without changing the bit length. Finally, the plaintext output unit 2d converts the decrypted values into character codes by reference to the conversion table, and outputs the sequence of the character codes as the plaintext 6.

Therefore, it is possible to surely prevent the generation, by encryption, of a bit sequence which is not listed in the conversion table, so that it is possible to easily produce an encrypted text represented by the character codes defined in a predetermined character encoding scheme, without complicated processing.

The encryption device 1 and the decryption device 2 can be used, for example, for encryption of data to be stored in a database or decryption of data read out from a database. Specifically, encryption of data to be stored in a database are considered in order to prevent information leakage caused by unauthorized access to a storage device used for construction of the database or theft of the storage device. Therefore, in the following explanations of the embodiments of the present invention, encryption of character data to be stored in a database is taken as an example.

2. First Embodiment

Hereinbelow, the first embodiment of the present invention is explained with reference to FIGS. 2 to 9.

2.1 System Configuration

Figure 2:
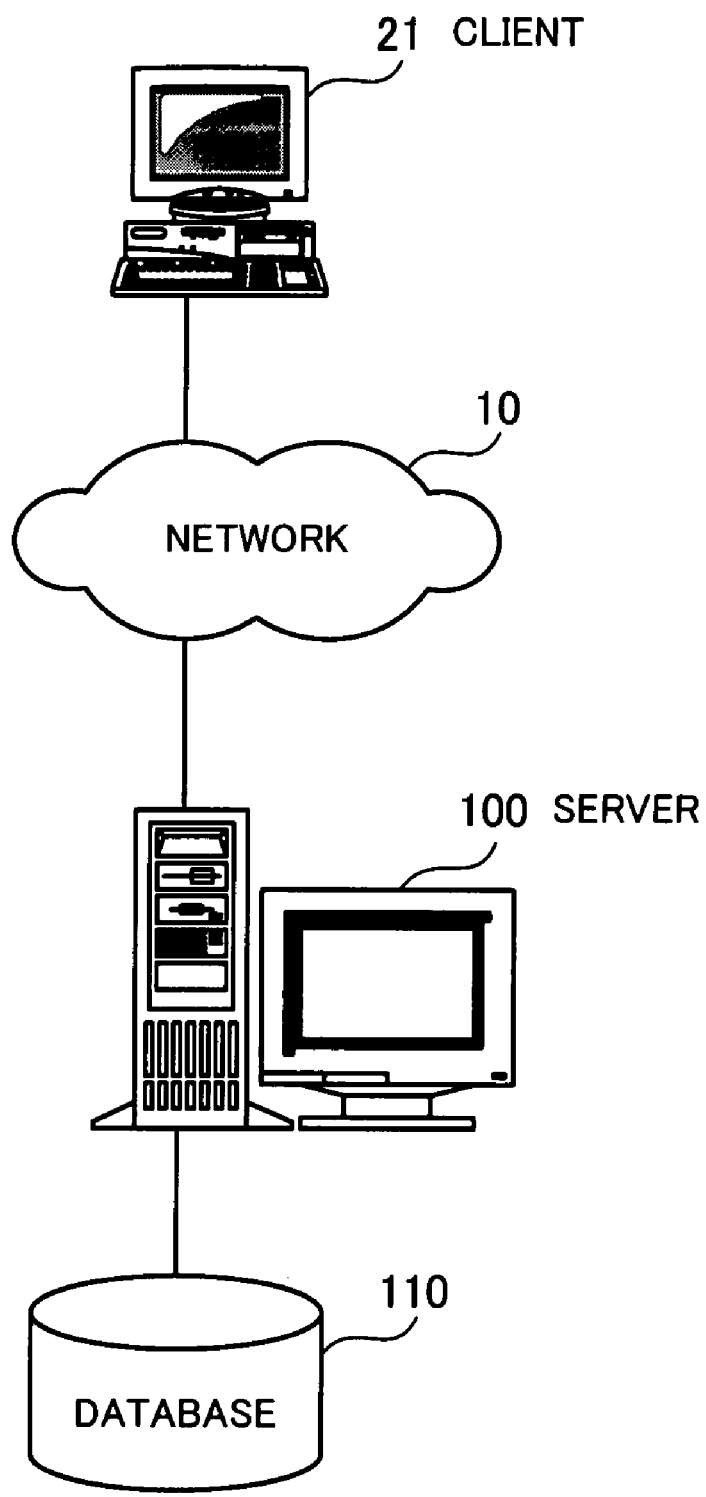
FIG. 2 is a diagram illustrating an example of a configuration of a system in which embodiments of the present invention are realized.

FIG. 2 is a diagram illustrating an example of a configuration of a database system in which the first embodiment of the present invention is realized. In the database system according to the first embodiment, character data to be stored in a database are encrypted. The database system of FIG. 2 comprises a server 100, a database 110, a client 21, and a network 10.

The client 21 is a computer used by a user, and is connected to the server 100 through the network 10. The server 100 is a computer having functions for management of the database 110, and is connected to the database 110. Encrypted character data are stored in the database 110.

When the client 21 handles data stored in the database 110, the client 21 sends a request for processing the data to the server 100 through the network 10. In response to the request from the client 21, the server 100 performs the processing of the data stored the database 110. When the requested processing is updating of the data, the server 100 encrypts character data and stores the encrypted data in the database 110. When the requested processing is searching for the data, the server 100 acquires an encrypted text from the database 110, decrypts the encrypted character text, and responds to the client 21.

As explained above, the server 100 performs processing for encryption and decryption of character data, and relays data between the client 21 and the database 110. Further, it is also possible to use an encryption technique such as DES (Data Encryption Standard) or AES (Advanced Encryption Standard) in the communication between the server 100 and the client 21.

2.2 Hardware Construction

Figure 3:
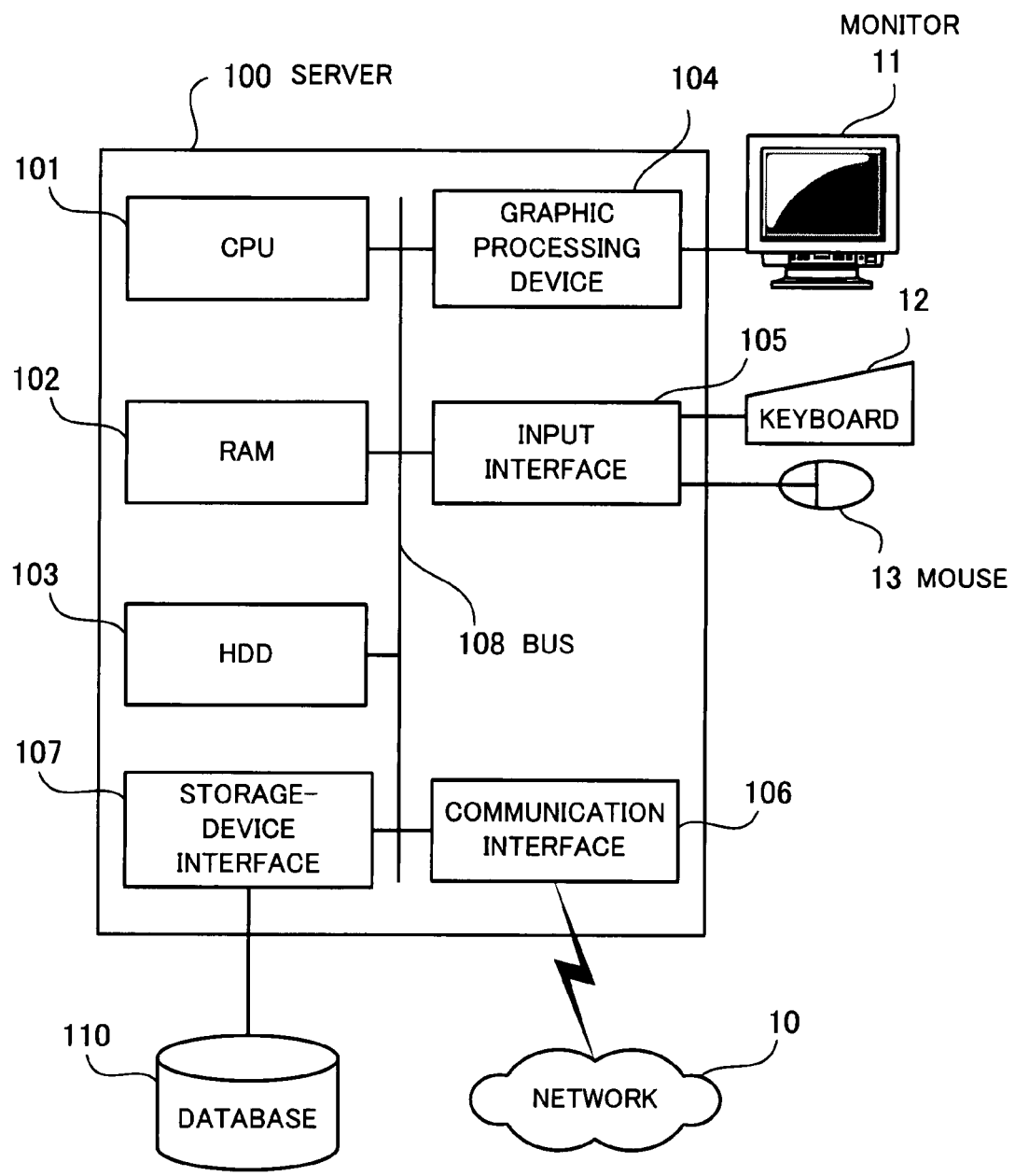
FIG. 3 is a diagram illustrating a hardware construction of a server.

FIG. 3 is a diagram illustrating a hardware construction of the server 100. The entire server 100 is controlled by a CPU (central processing unit) 101, to which a RAM (random access memory) 102, an HDD (hard disk drive) 103, a graphic processing device 104, an input interface 105, a communication interface 106, and a storage-device interface 107 are connected through a bus 108. The RAM 102 temporarily stores at least portions of an OS (operating system) program and application programs which are executed by the CPU 101, as well as various types of data necessary for processing by the CPU 101. The HDD 103 stores the OS program and the application programs. A monitor 11 is connected to the graphic processing device 104, which makes the monitor 11 display an image on a screen in accordance with an instruction from the CPU 101. A keyboard 12 and a mouse 13 are connected to the input interface 105, which transmits signals sent from the keyboard 12 and the mouse 13, to the CPU 101 through the bus 108. The communication interface 106 is connected to the network 10, and exchanges data with other computers through the network 10. The storage-device interface 107 is a communication interface used for input and output of data into and from the database 110.

By using the above hardware construction, it is possible to realize the functions of the server 100 according to the first embodiment. In addition, the client 21 can also be realized by using a similar hardware construction.

2.3 Functions of the Server 100

Hereinbelow, the functions of the server 100 are explained.

Figure 4:
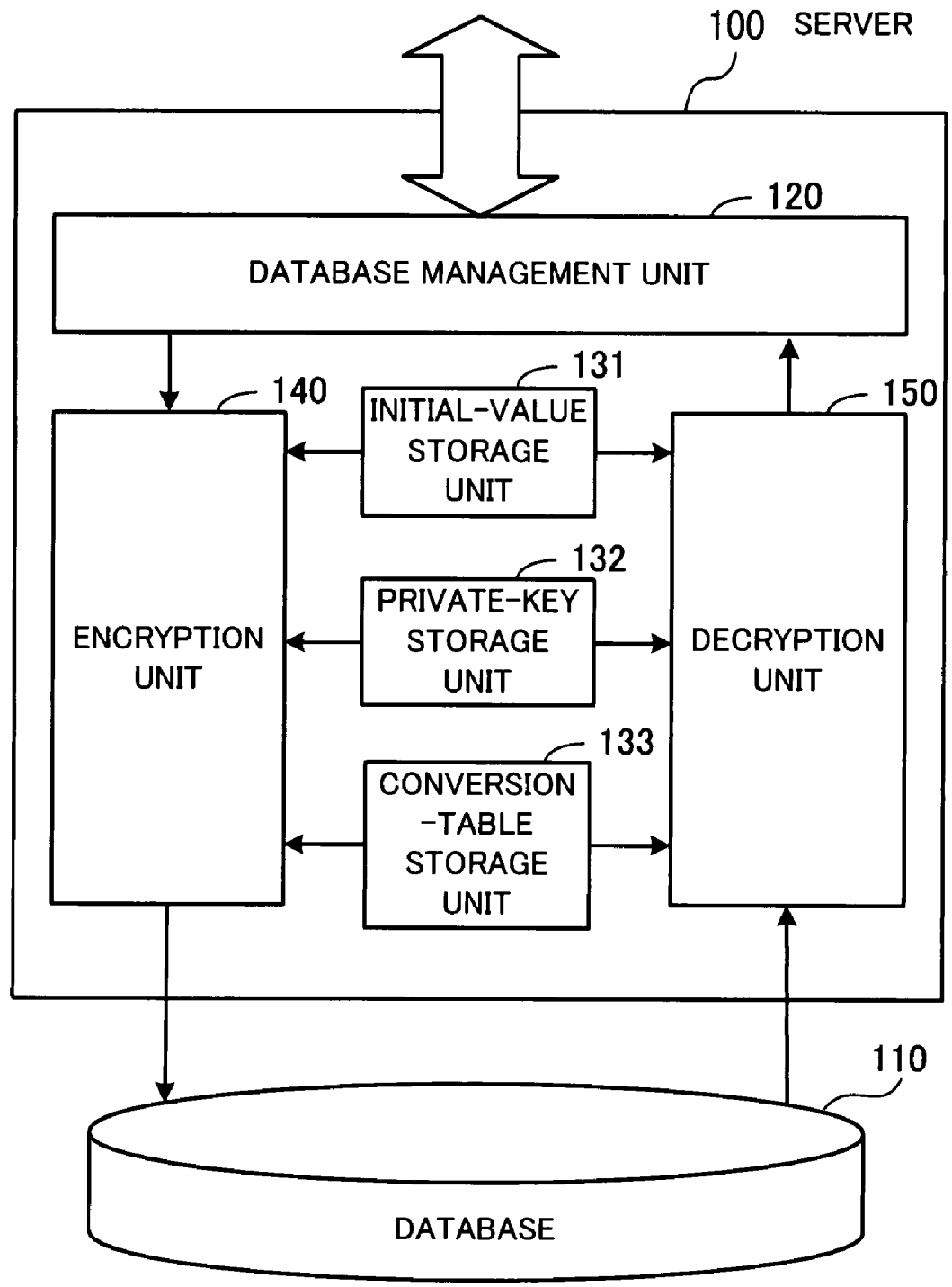
FIG. 4 is a block diagram illustrating the functions of a server according to the first embodiment of the present invention.

FIG. 4 is a block diagram illustrating the functions of the server 100 according to the first embodiment of the present invention. The server 100 comprises a database management unit 120, an initial-value storage unit 131, a private-key storage unit 132, a conversion-table storage unit 133, an encryption unit 140, and a decryption unit 150.

The database management unit 120 performs processing for inputting and outputting data into and from the database 110. When character data is required to be inputted into the database 110, the database management unit 120 writes the character data into the database 110 through the encryption unit 140. When character data is required to be acquired from the database 110 and outputted to the client 21, the database management unit 120 acquires the character data from the database 110 through the decryption unit 150.

The initial-value storage unit 131 stores an initial vector which is used in the encryption and decryption performed in the encryption unit 140 and the decryption unit 150. The initial vector is a bit sequence which is used when a leading character is encrypted or decrypted. The private-key storage unit 132 stores a private key which is used in the encryption and decryption performed in the encryption unit 140 and the decryption unit 150. The conversion-table storage unit 133 stores a conversion table in which correspondences between character codes and indexes identifying the character codes are defined.

The encryption unit 140 encrypts character data received from the database management unit 120, by reference to the initial-value storage unit 131, the private-key storage unit 132, and the conversion-table storage unit 133, and stores the encrypted character data in the database 110.

The decryption unit 150 acquires encrypted character data from the database 110 in response to a request from the database management unit 120, and decrypts the acquired, encrypted character data by reference to the initial-value storage unit 131, the private-key storage unit 132, and the conversion-table storage unit 133. Then, the decryption unit 150 passes the decrypted character data to the database management unit 120.

FIG. 5 is a diagram illustrating an example of a data structure of the conversion table. The conversion table 133a of FIG. 5 is stored in the conversion-table storage unit 133. The conversion table 133a has the fields of "Index," "Character Code," and "Number of Valid Bits." In the conversion table 133a, the information items tabulated on each row are associated with each other.

The index is a numerical value for uniquely identifying each a character code. Specifically, numbers beginning from "0" are successively assigned to the character codes. In FIG. 5, the indexes are represented by binary numbers.

The character codes are numerical values which are defined in a predetermined character encoding scheme so as to identify the characters. It is sufficient that a one-to-one correspondence exists between the character codes and the indexes, and it is unnecessary to arrange the character codes in the order of the indexes. In FIG. 5, the character codes are represented by hexadecimal numbers.

The number of valid bits is the number of one or more of the bits representing each index which are subject to encryption or decryption. For example, when the number of valid bits is four, the four less significant bits of the index is to be encrypted or decrypted. The sequence of the one or more of the bits representing each index which are subject to encryption or decryption corresponds to the index value explained before in the SUMMARY OF THE INVENTION and the section "1. Outline of the Present Invention."

The numbers of valid bits and the number of the character codes which are associated with the valid bits are determined by decomposing the total number of the character codes to be stored in the conversion table 133a into a sum of components of $2^i$ (where i is a natural number). For example, when the total number of the character codes stored in the conversion table 133a is 26, the number 26 can be decomposed as $$26=2^4(16)+2^3(8)+2^1(2).$$

Thus, the character codes stored in the conversion table 133a are divided into 16 character codes each associated with 4 valid bits, 8 character codes each associated with 3 valid bits, and 2 character codes each associated with 1 valid bit.

In the following explanations of the first embodiment, for the sake of simplicity, a character encoding scheme in which character codes corresponding to only 26 alphabetic characters are defined is taken as an example as indicated in FIG. 5. In this example, a greater number of valid bits are assigned to alphabetic characters which more frequently appear in plaintexts. This is because encryption of a character is realized by conversion within a group of character codes associated with an identical number of valid bits. For example, when the character "E" is encrypted, the character "E" is converted to one of the sixteen characters. When the character "Q" is encrypted, the character "Q" is converted to one of the characters "Q" and "Z." Therefore, from the viewpoint of security, it is not preferable to assign a smaller number of valid bits which has few conversion patterns, to the characters which more frequently appear in plaintexts.

Next, the functions of the encryption unit 140 are explained below with reference to FIGS. 6 and 7. In the following explanations, it is assumed that the encryption algorithm is in accordance with DES, and the encryption mode is CFB (Cipher Feedback) mode.

Figure 6:
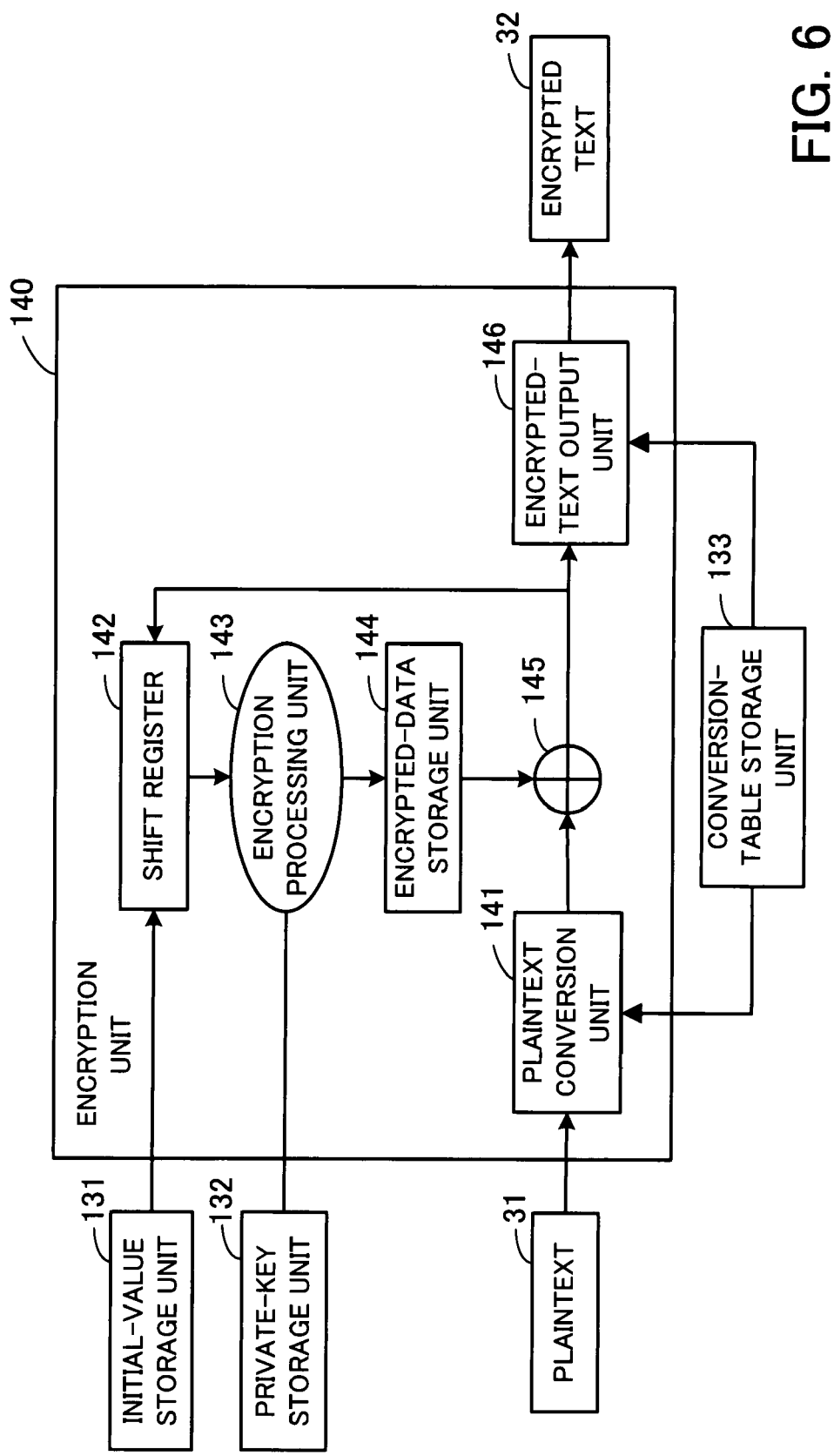
FIG. 6 is a block diagram illustrating examples of functions of an encryption unit in the database system according to the first embodiment.

FIG. 6 is a block diagram illustrating examples of functions of the encryption unit 140 in the database system according to the first embodiment. The encryption unit 140 comprises a plaintext conversion unit 141, a shift register 142, an encryption processing unit 143, an encrypted-data storage unit 144, an EOR calculation unit 145, and an encrypted-text output unit 146.

When a plaintext 31 is inputted from the database management unit 120 into the encryption unit 140, the plaintext conversion unit 141 converts each character code constituting the plaintext 31 into a bit sequence which is to be encrypted, by reference to the conversion table 133a in the conversion-table storage unit 133. The bit sequence which is to be encrypted is a sequence of valid one or ones of the bits constituting the index indicated in association with each character code in the conversion table 133a. That is, the plaintext conversion unit 141 cuts out from the index indicated in the conversion table 133a one or more less significant bits of the index the number of which equals the number of valid bits. Then, the plaintext conversion unit 141 successively supplies the bit sequence to be encrypted to the EOR calculation unit 145.

The shift register 142 can hold a bit sequence having a predetermined bit length, and shift the bit sequence leftward. When a result of calculation is outputted from the EOR calculation unit 145, the bit sequence stored in the shift register 142 is shifted leftward by the number of bits of the result of calculation, and the result of calculation is set on the right side of the shifted bit sequence in the shift register 142. When the encryption processing is started, the initial vector stored in the initial-value storage unit 131 is set in the shift register 142.

The encryption processing unit 143 encrypts the values held in the shift register 142 in accordance with the DES algorithm by use of the private key stored in the private-key storage unit 132. Then, the encryption processing unit 143 stores the encrypted values in the encrypted-data storage unit 144.

The EOR calculation unit 145 acquires from the plaintext conversion unit 141 the bit sequence to be encrypted, and cuts out, from the bits stored in the encrypted-data storage unit 144, a portion of the bits ranging from the leading bit and having the same length as the bit sequence to be encrypted. Then, the EOR calculation unit 145 calculates the exclusive OR of the bits cut out from the encrypted-data storage unit 144 and the bit sequence to be encrypted, and outputs a bit sequence of the calculation result to the encrypted-text output unit 146 and the shift register 142.

The encrypted-text output unit 146 acquires the bit sequence of the calculation result from the EOR calculation unit 145, and converts the acquired bit sequence into a character code by reference to the conversion table 133a. The character code is determined on the basis of the index and the number of valid bits indicated in the conversion table 133a. In addition, the encrypted-text output unit 146 combines the character codes converted from the bit sequences of the calculation results corresponding to the plaintext 31, and outputs the combined character codes as an encrypted text 32 corresponding to the plaintext 31. The encrypted text 32 is stored in the database 110.

Figure 7:
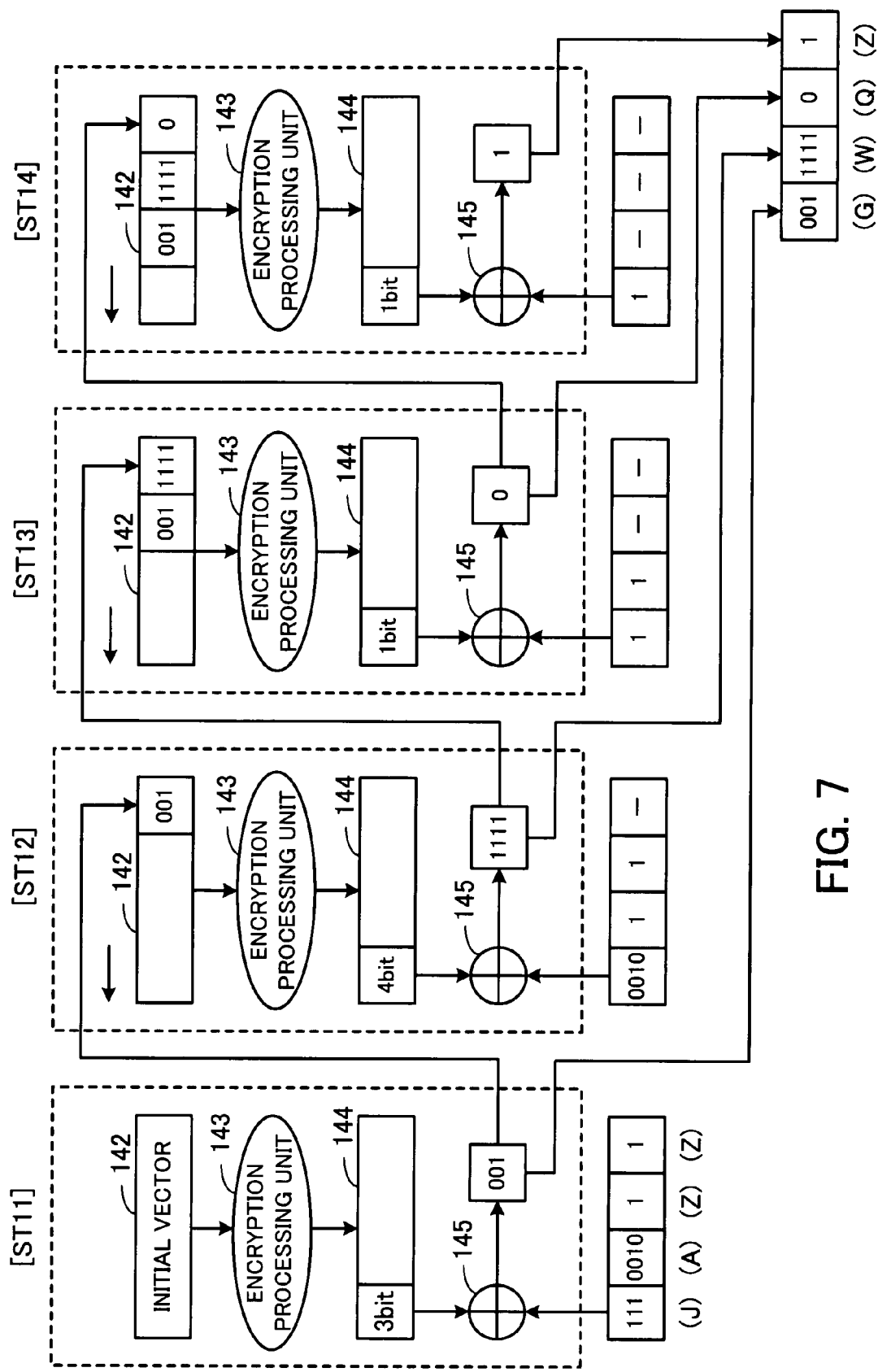
FIG. 7 is a diagram illustrating an example of a sequence of operations for encryption according to the first embodiment.

FIG. 7 is a diagram illustrating an example of a sequence of operations for the encryption according to the first embodiment. In the example of FIG. 7, a sequence of character codes representing a plaintext "JAZZ" is encrypted.

In the first step ST11, processing for encryption of the first character "J" is performed. At this time, the initial vector is set in the shift register 142. When the encryption is started, first, the encryption processing unit 143 encrypts the values in the shift register 142, and stores the encrypted values in the encrypted-data storage unit 144. Then, the EOR calculation unit 145 extracts the leading three bits held in the encrypted-data storage unit 144, and calculates the exclusive OR of the bit sequence "111" corresponding to the character "J" and the leading three bits extracted from the encrypted-data storage unit 144. For example, a bit sequence "001" is obtained as the calculation result, and the encrypted-text output unit 146 converts the bit sequence "001" into the character code corresponding to the character "G."

In the second step ST12, processing for encryption of the second character "A" is performed. At this time, the bit sequence held in the shift register 142 is shifted leftward by three bits, and the preceding calculation result "001" (which is the calculation result in the preceding step ST11) is set on the right side of the shifted bit sequence in the shift register 142. Then, the encryption processing unit 143 encrypts the values held in the shift register 142, and stores the encrypted values in the encrypted-data storage unit 144. Next, the EOR calculation unit 145 extracts the leading four bits held in the encrypted-data storage unit 144, and calculates the exclusive OR of the bit sequence "0011" corresponding to the character "A" and the leading four bits extracted from the encrypted-data storage unit 144. For example, a bit sequence "1111" is obtained as the calculation result, and the encrypted-text output unit 146 converts the bit sequence "1111" into the character code corresponding to the character "W."

In the third and fourth steps ST13 and ST14, processing for encryption of the third character "Z" and processing for encryption of the fourth character "Z" are successively performed in similar manners, so that the bit sequence "0" is obtained in the step ST13, and the bit sequence "1" is obtained in the step ST14. The bit sequences obtained in the steps ST13 and ST14 are different because the results of encryption depend on the results of previous encryption in the CFB mode.

Thus, the encrypted-text output unit 146 outputs a character string "GWQZ" as the encrypted text 32.

Next, the functions of the decryption unit 150 are explained below with reference to FIGS. 8 and 9. In the following explanations, it is also assumed that the encryption algorithm is in accordance with DES, and the encryption mode is the CFB mode.

Figure 8:
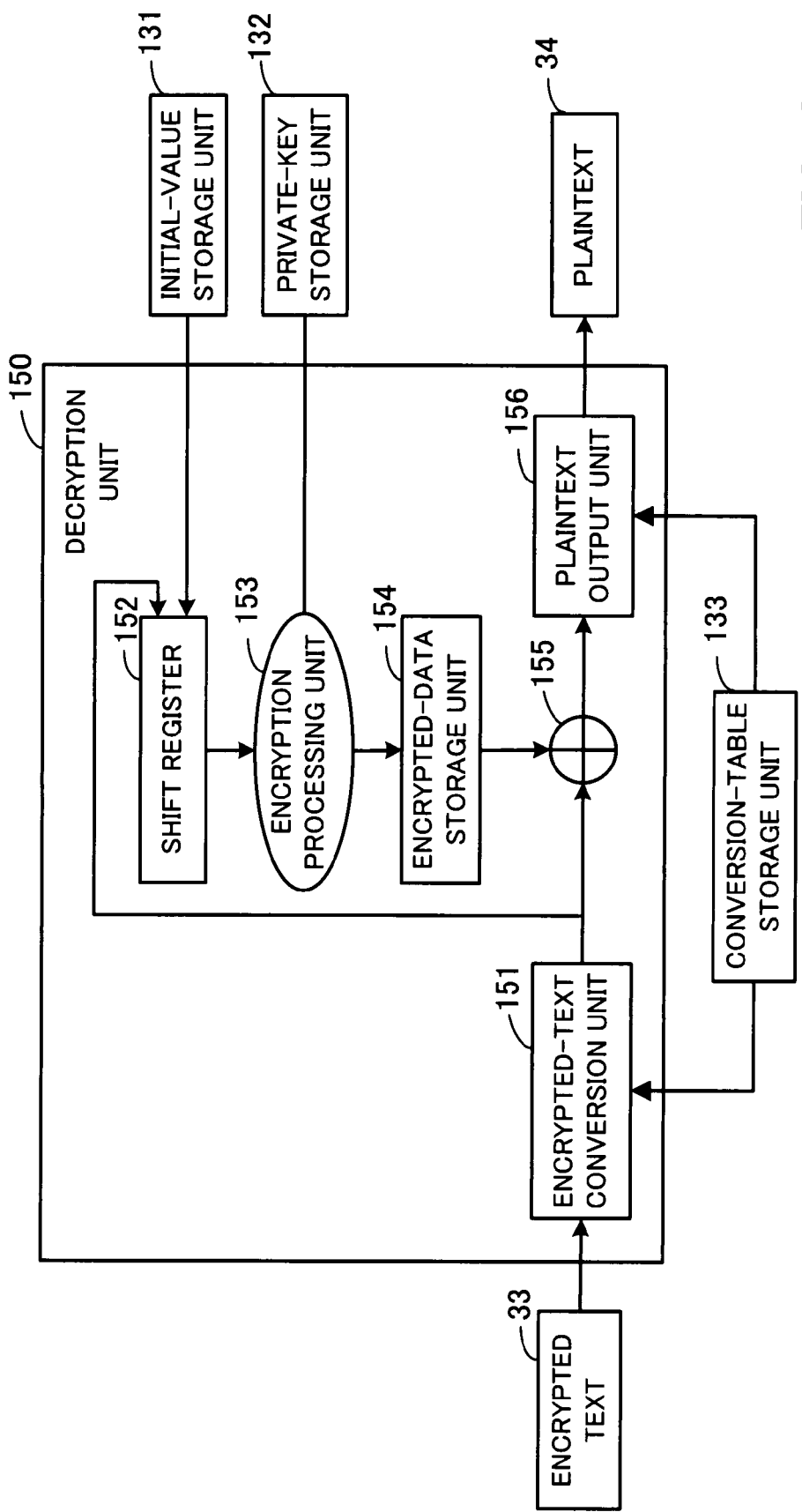
FIG. 8 is a block diagram illustrating examples of functions of a decryption unit in the database system according to the first embodiment.

FIG. 8 is a block diagram illustrating examples of functions of the decryption unit 150 in the database system according to the first embodiment. The decryption unit 150 comprises an encrypted-text conversion unit 151, a shift register 152, an encryption processing unit 153, an encrypted-data storage unit 154, an EOR calculation unit 155, and a plaintext output unit 156.

The encrypted-text conversion unit 151 acquires an encrypted text 33 from the database 110 in response to a request from the database management unit 120, and converts each character code constituting the encrypted text 33 into a bit sequence which is to be decrypted, by reference to the conversion table 133a in the conversion-table storage unit 133. The bit sequence which is to be decrypted is a valid one of or a sequence of valid ones of the bits constituting the index indicated in association with each character code in the conversion table 133a. That is, the encrypted-text conversion unit 151 cuts out from the index indicated in the conversion table 133a one or more less significant bits of the index the number of which equals the number of valid bits. Then, the encrypted-text conversion unit 151 successively supplies the bit sequence to be decrypted to the EOR calculation unit 155.

The shift register 152 can hold a bit sequence having a predetermined bit length, and shift the bit sequence leftward. When the EOR calculation unit 155 performs calculation, the bit sequence stored in the shift register 152 is shifted leftward by the number of bits of the bit sequence to be decrypted, and the bit sequence to be decrypted is set on the right side of the shifted bit sequence in the shift register 152. When the decryption processing is started, the initial vector stored in the initial-value storage unit 131 is set in the shift register 152.

The encryption processing unit 153 encrypts the values held in the shift register 152 in accordance with the DES algorithm by use of the private key stored in the private-key storage unit 132. Then, the encryption processing unit 153 stores the encrypted values in the encrypted-data storage unit 154.

The EOR calculation unit 155 acquires from the encrypted-text conversion unit 151 the bit sequence to be decrypted, and cuts out, from the bits stored in the encrypted-data storage unit 154, a portion of the bits ranging from the leading bit and having the same length as the bit sequence to be decrypted. Then, the EOR calculation unit 155 calculates the exclusive OR of the bits cut out from the encrypted-data storage unit 154 and the bit sequence to be decrypted, and outputs a bit sequence of the calculation result to the plaintext output unit 156. At this time, the bit sequence to be decrypted is also inputted into the shift register 152.

The plaintext output unit 156 acquires the bit sequence of the calculation result from the EOR calculation unit 155, and converts the acquired bit sequence into a character code by reference to the conversion table 133a. The character code is determined on the basis of the index and the number of valid bits indicated in the conversion table 133a. In addition, the plaintext output unit 156 combines the character codes converted from the bit sequences of the calculation results corresponding to the encrypted text 33, and outputs to the database management unit 120 the combined character codes as a plaintext 34 corresponding to the encrypted text 33.

Figure 9:
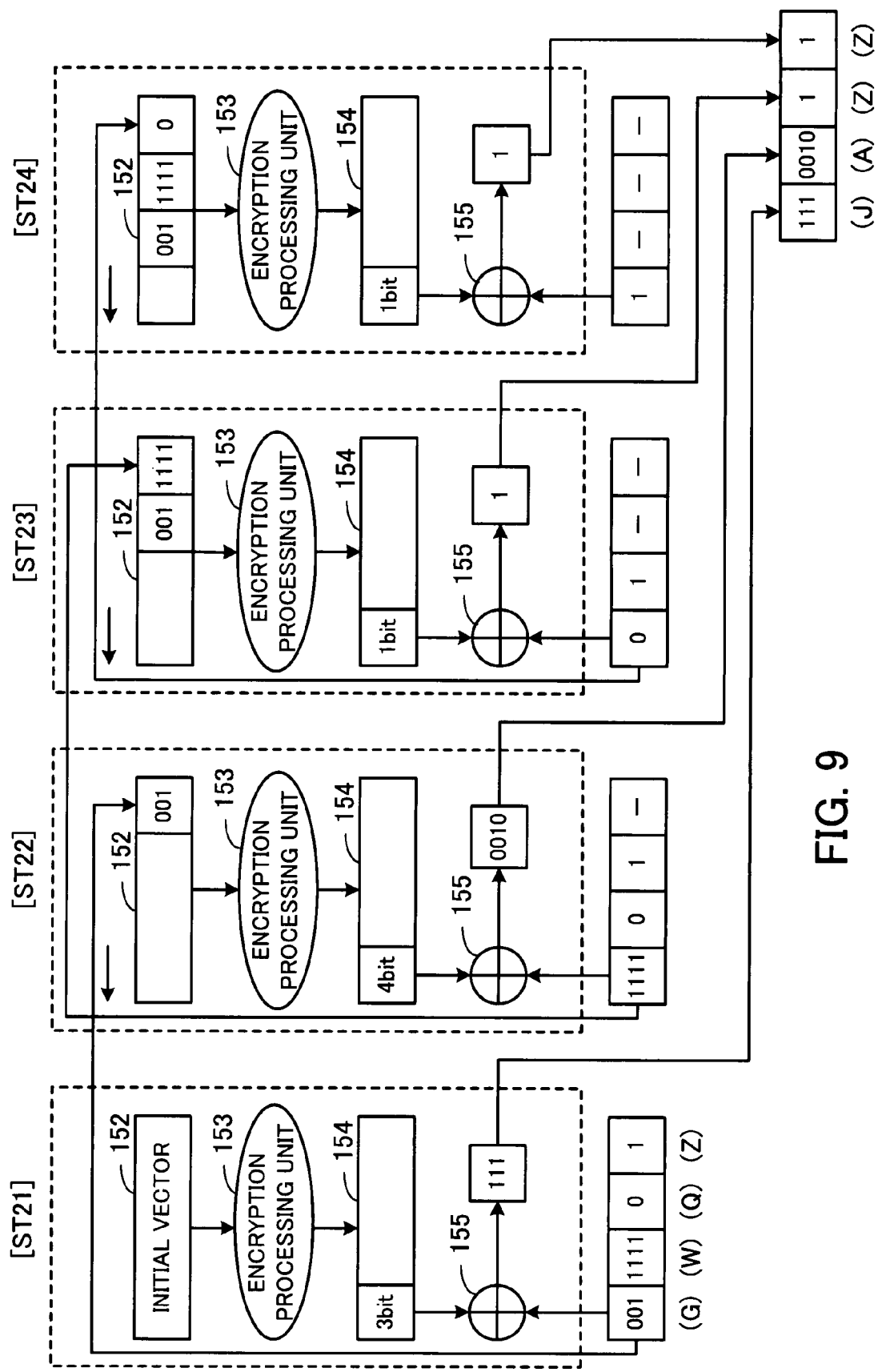
FIG. 9 is a diagram illustrating an example of a sequence of operations for decryption according to the first embodiment.

FIG. 9 is a diagram illustrating an example of a sequence of operations for the decryption according to the first embodiment. In the example of FIG. 9, encrypted data representing an encrypted text "GWQZ" is decrypted.

In the first step ST21, processing for decryption of the first character "G" is performed. At this time, the initial vector is set in the shift register 152. When the decryption is started, first, the encryption processing unit 153 encrypts the values in the shift register 152, and stores the encrypted values in the encrypted-data storage unit 154. Then, the EOR calculation unit 155 extracts the leading three bits held in the encrypted-data storage unit 154, and calculates the exclusive OR of the bit sequence "001" corresponding to the character "G" and the leading three bits extracted from the encrypted-data storage unit 154. For example, a bit sequence "111" is obtained as the calculation result, and the plaintext output unit 156 converts the bit sequence "111" into the character code corresponding to the character "J."

In the second step ST22, processing for decryption of the second character "W" is performed. At this time, the bit sequence held in the shift register 152 is shifted leftward by three bits, and the preceding calculation result "001" (which is the bit sequence decrypted in the preceding step ST21) is set on the right side of the shifted bit sequence in the shift register 152. Then, the encryption processing unit 153 encrypts the values held in the shift register 152, and stores the encrypted values in the encrypted-data storage unit 154. Next, the EOR calculation unit 155 extracts the leading four bits of the values held in the encrypted-data storage unit 154, and calculates the exclusive OR of the bit sequence "1111" corresponding to the character "W" and the leading four bits extracted from the encrypted-data storage unit 154. For example, a bit sequence "0010" is obtained as the calculation result, and the plaintext output unit 156 converts the bit sequence "0010" into the character code corresponding to the character "A."

In the third and fourth steps ST23 and ST24, processing for decryption of the third character "Q" and processing for decryption of the fourth character "Z" are successively performed in similar manners, so that the bit sequence "1" is obtained in the step ST23, and the bit sequence "1" is obtained in the step ST24.

Thus, the plaintext output unit 156 outputs as a plaintext 34 a character string "JAZZ" produced as above.

When the server 100 according to the first embodiment which performs the above processing for encryption and decryption is used, it is possible to readily produce encrypted data which has the same length as the original character data and is formed of only a character code, and decrypt such encrypted data. Therefore, the server 100 can normally store the encrypted data even in the databases which are arranged to handle only character data, and can thus prevent unauthorized access to the data stored in the databases.

3. Second Embodiment

Figure 10:
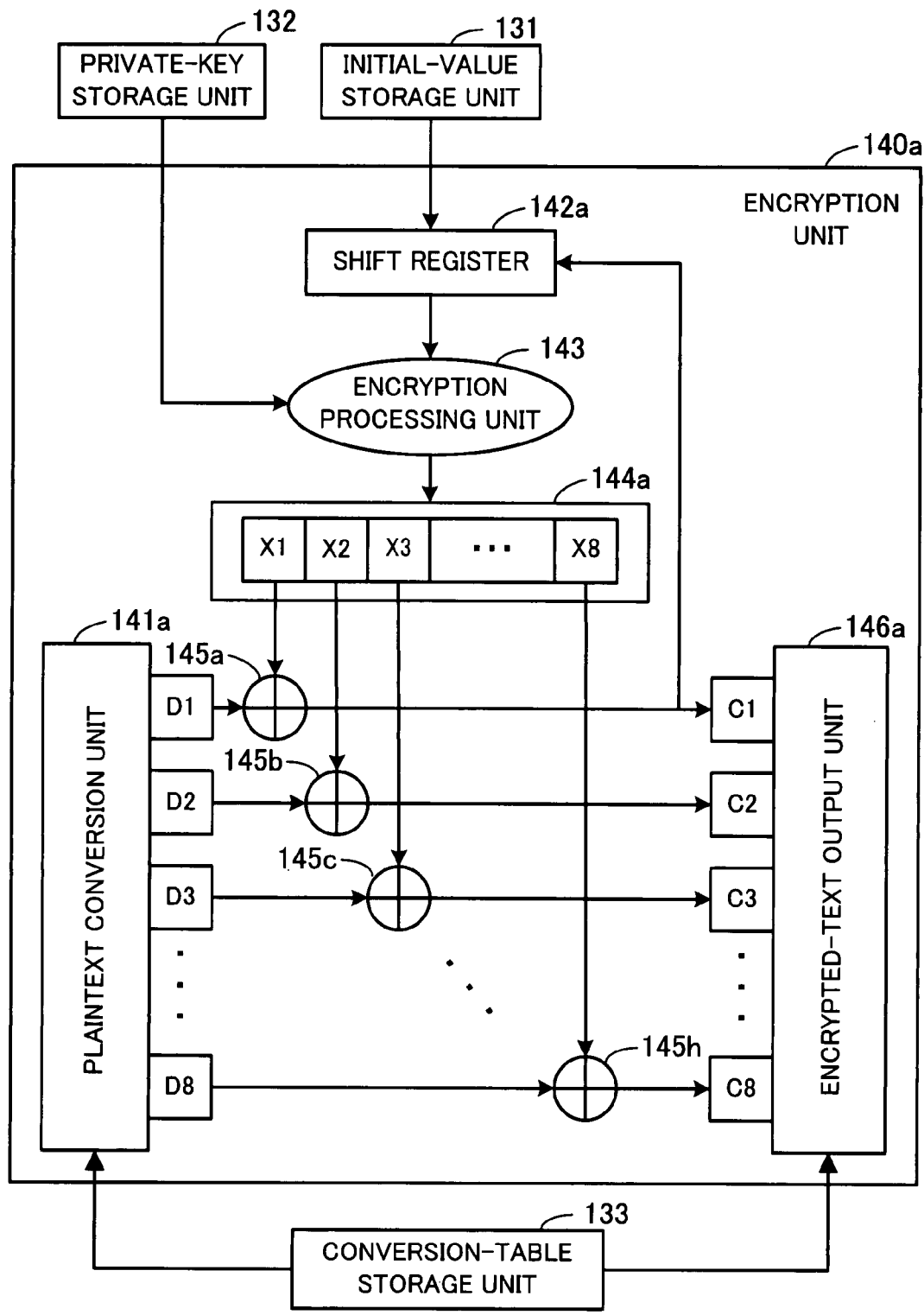
FIG. 10 is a block diagram illustrating examples of functions of an encryption unit in the database system according to the second embodiment.
Figure 11:
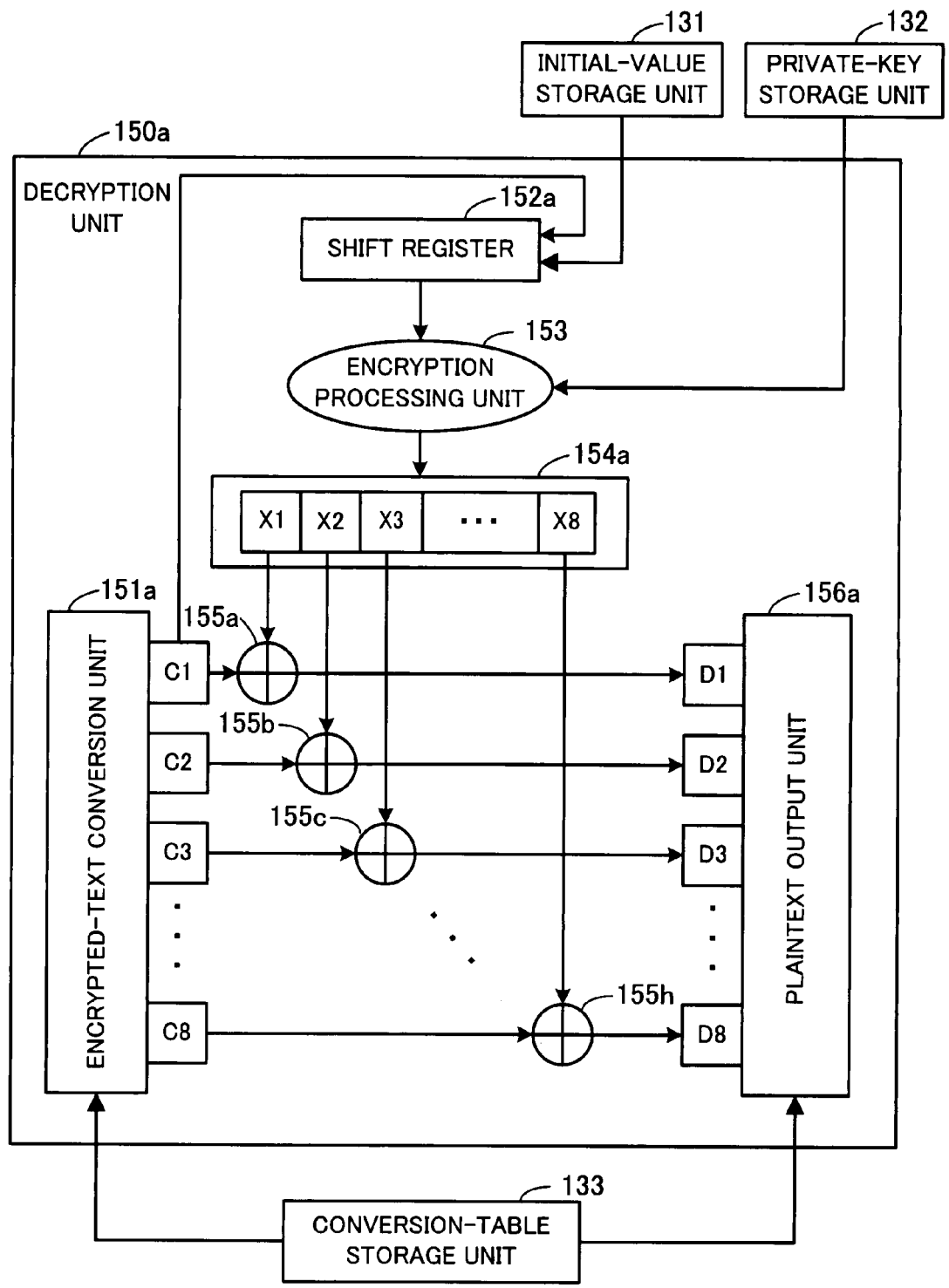
FIG. 11 is a block diagram illustrating examples of functions of a decryption unit in the database system according to the second embodiment.

Hereinbelow, the second embodiment of the present invention is explained with reference to FIGS. 10 and 11. The database system according to the second embodiment is arranged to be capable of parallelly performing processing for encryption and decryption of a plurality of characters, although the encryption and decryption of each character are similar to the first embodiment. The second embodiment is different from the first embodiment basically in the functions of the encryption unit and the decryption unit in the server, although the system configuration for the second embodiment is similar to the system configuration for the first embodiment. The following explanations are focused on the differences from the first embodiment. That is, the functions of the encryption unit 140a (which replaces the encryption unit 140) and the decryption unit 150a (which replaces the decryption unit 150) are explained below.

First, the functions of the encryption unit according to the second embodiment are explained below with reference to FIG. 10, which is a block diagram illustrating examples of functions of the encryption unit 140a in the database system according to the second embodiment. The encryption unit 140a comprises a plaintext conversion unit 141a, a shift register 142a, an encryption processing unit 143, an encrypted-data storage unit 144a, a plurality of EOR calculation units 145a, 145b, 145c, ..., 145h, and an encrypted-text output unit 146a.

When a plaintext is inputted into the encryption unit 140a, the plaintext conversion unit 141a converts each character code constituting the plaintext into a bit sequence which is to be encrypted. At this time, the plaintext conversion unit 141a can parallelly perform conversion of a predetermined number of character codes. In the example illustrated in FIG. 10, the predetermined number is eight. The plaintext conversion unit 141a concurrently outputs eight bit sequences (which are produced by the above conversion and are to be encrypted) respectively to the EOR calculation units 145a, 145b, 145c, ..., 145h.

The shift register 142a can hold a bit sequence having a predetermined bit length, and shift the bit sequence leftward. When a result of calculation is outputted from the EOR calculation unit 145a, the bit sequence stored in the shift register 142a is shifted leftward by the number of bits of the result of calculation, and the result of calculation is set on the right side of the shifted bit sequence in the shift register 142a.

The encryption processing unit 143 encrypts the values held in the shift register 142a, and stores the encrypted values in the encrypted-data storage unit 144a. At this time, the bits constituting the encrypted values stored in the encrypted-data storage unit 144a are divided into a plurality of partial bit sequences. The number of the partial bit sequences is identical to the number of the parallelly processed character codes. In the example illustrated in FIG. 10, the number of the partial bit sequences is eight.

The EOR calculation unit 145a acquires from the plaintext conversion unit 141a a corresponding one of the bit sequences to be encrypted, acquires the first partial bit sequence from the encrypted-data storage unit 144a, and cuts out a portion of the first partial bit sequence ranging from the leading bit of the first partial bit sequence and having the same length as the bit sequence to be encrypted. Then, the EOR calculation unit 145a calculates the exclusive OR of the portion of the first partial bit sequence and the bit sequence to be encrypted. Similarly, each of the EOR calculation units 145b, 145c, ..., 145h acquires from the plaintext conversion unit 141a a corresponding one of the bit sequences to be encrypted, acquires the corresponding partial bit sequence from the encrypted-data storage unit 144a, and calculates the exclusive OR of the corresponding one of the bit sequences to be encrypted and a portion of the corresponding partial bit sequence.

The encrypted-text output unit 146a acquires the bit sequences of the calculation results from the EOR calculation units 145a, 145b, 145c, ..., 145h, and converts the acquired bit sequences into character codes, respectively. The character codes are determined on the basis of the indexes and the numbers of valid bits indicated in the conversion table 133a. In addition, the encrypted-text output unit 146a combines the character codes converted from the bit sequences of the calculation results corresponding to the plaintext, and outputs the combined character codes as an encrypted text corresponding to the plaintext.

The maximum number of character codes which can be parallelly processed by the encryption unit 140a is determined on the basis of the bit length of the bits stored in the encrypted-data storage unit 144a and the maximum number of valid bits indicated in the conversion table 133a. For example, in the case where the bit length of the bits stored in the encrypted-data storage unit 144a is thirty-two and the maximum number of valid bits indicated in the conversion table 133a is four, the maximum number of character codes which can be parallelly processed is eight.

Next, the functions of the decryption unit according to the second embodiment are explained below with reference to FIG. 11, which is a block diagram illustrating examples of functions of the encryption unit 150a in the database system according to the second embodiment. The decryption unit 150a comprises an encrypted-text conversion unit 151a, a shift register 152a, an encryption processing unit 153, an encrypted-data storage unit 154a, a plurality of EOR calculation units 155a, 155b, 155c, ..., 155h, and a plaintext output unit 156a.

When the encrypted-text conversion unit 151a acquires an encrypted text, the encrypted-text conversion unit 151a converts each character code constituting the encrypted text into a bit sequence which is to be decrypted. At this time, the plaintext conversion unit 141a can parallelly perform conversion of a predetermined number of character codes. In the example illustrated in FIG. 11, the predetermined number is eight. The plaintext conversion unit 151a parallelly outputs bit sequences (which are produced by the above conversion and are to be decrypted) respectively to the EOR calculation units 155a, 155b, 155c, ..., 155h.

The shift register 152a can hold a bit sequence having a predetermined bit length, and shift the bit sequence leftward. When the EOR calculation unit 155a performs calculation, the bit sequence stored in the shift register 152a is shifted leftward by the number of bits of the bit sequence to be decrypted, and the bit sequence to be decrypted is set on the right side of the shifted bit sequence in the shift register 152a.

The encryption processing unit 153 encrypts the values held in the shift register 152a, and stores the encrypted values in the encrypted-data storage unit 154a. At this time, the bits constituting the encrypted values stored in the encrypted-data storage unit 154a are divided into a plurality of partial bit sequences. The number of the partial bit sequences is identical to the number of the parallelly processed character codes. In the example illustrated in FIG. 10, the number of the partial bit sequences is eight.

The EOR calculation unit 155a acquires from the plaintext conversion unit 151a a corresponding one of the bit sequences to be decrypted, acquires the first partial bit sequence from the encrypted-data storage unit 154a, and cuts out a portion of the first partial bit sequence ranging from the leading bit of the first partial bit sequence and having the same length as the bit sequence to be decrypted. Then, the EOR calculation unit 155a calculates the exclusive OR of the portion of the first partial bit sequence and the bit sequence to be decrypted. Similarly, each of the EOR calculation units 155b, 155c, ..., 155h acquires from the plaintext conversion unit 151a a corresponding one of the bit sequences to be decrypted, acquires the corresponding partial bit sequence from the encrypted-data storage unit 154a, and calculates the exclusive OR of the corresponding one of the bit sequences to be decrypted and a portion of the corresponding partial bit sequence.

The plaintext output unit 156a acquires the bit sequences of the calculation results from the EOR calculation units 155a, 155b, 155c, ..., 155h, and converts the acquired bit sequences into character codes, respectively. The character codes are determined on the basis of the indexes and the numbers of valid bits indicated in the conversion table 133a. In addition, the plaintext output unit 156a combines the character codes converted from the bit sequences of the calculation results corresponding to the plaintext, and outputs the combined character codes as a plaintext corresponding to the encrypted text.

Similar to the encryption unit 140a, the maximum number of character codes which can be parallelly processed by the decryption unit 150a is determined on the basis of the bit length of the bits stored in the encrypted-data storage unit 154a and the maximum number of valid bits indicated in the conversion table 133a.

When the server according to the second embodiment which performs the above processing for encryption and decryption is used, it is possible to achieve similar advantages to the first embodiment. In addition, when the server according to the second embodiment is used, it is possible to greatly increase the processing speed of the encryption and decryption.

4. Third Embodiment

Hereinbelow, the third embodiment of the present invention is explained with reference to FIGS. 12 to 17. The capabilities of the database system according to the third embodiment are enhanced over the first embodiment so as to strengthen the encryption security. The following explanations are focused on the differences from the first embodiment.

In an encryption mode realizing a block-chaining function such as the CFB mode, each character is encrypted by using an encrypted value obtained in a preceding step. Therefore, an identical character string is encrypted into different encrypted values before and after appearance of a character different from the identical character string. However, when a great number of plaintexts each of which is likely to have an identical leading portion are encrypted in an ordinary encryption mode, the encryption strength can be lowered. For example, an identical character string such as "Tokyo, Japan" can frequently appear in leading portions of plaintexts indicating residential addresses. Therefore, when a great number of plaintexts indicating residential addresses are encrypted, a great number of encrypted texts which contain identical leading portions can be produced, even in the case where the encryption is performed in an encryption mode realizing a block-chaining function. In particular, in the case where a great amount of character data of residential addresses, telephone numbers, and the like which are likely to contain identical leading portions are stored in a database, a great number of encrypted texts which contain identical leading portions can be produced, and give a clue to break the encryption.

Therefore, the database system according to the third embodiment is arranged so that encrypted texts do not contain identical leading portions even when plaintexts containing identical leading portions are encrypted.

Figure 12:
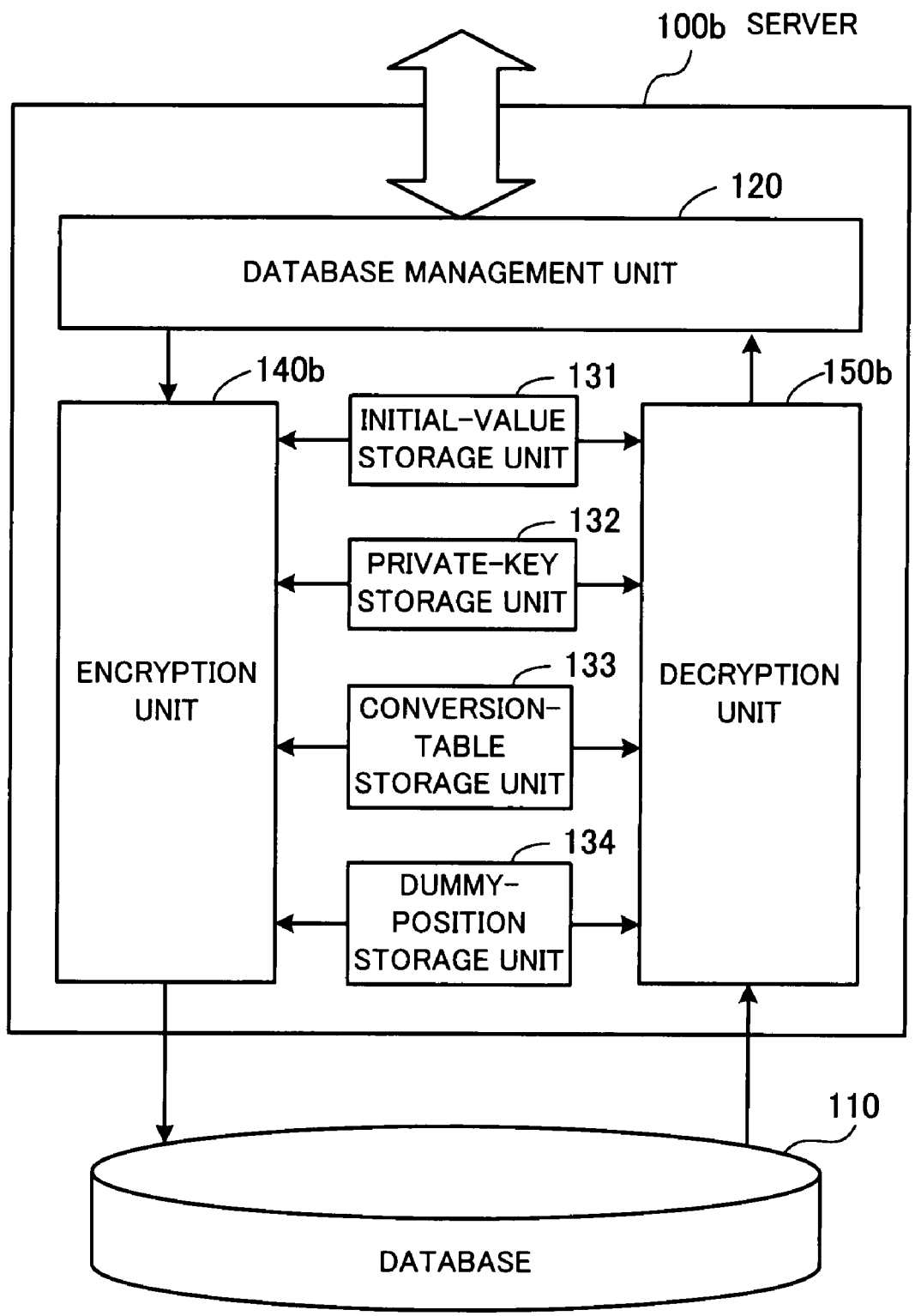
FIG. 12 is a block diagram illustrating the functions of a server according to the third embodiment of the present invention.

FIG. 12 is a block diagram illustrating the functions of the server according to the third embodiment of the present invention. The sever 100b comprises a database management unit 120, an initial-value storage unit 131, a private-key storage unit 132, a conversion-table storage unit 133, a dummy-position storage unit 134, an encryption unit 140b, and a decryption unit 150b. The database management unit 120, the initial-value storage unit 131, the private-key storage unit 132, and the conversion-table storage unit 133 respectively have the same constructions and functions as the corresponding units in the server 100 according to the first embodiment.

The dummy-position storage unit 134 stores position information which indicates the position of a character code selected as a dummy character by the encryption unit 140b and the position of a character code selected as a dummy code by the decryption unit 150b. The dummy character and the dummy code are explained later.

The encryption unit 140b receives character data from the database management unit 120, encrypts the character data by reference to the initial-value storage unit 131, the private-key storage unit 132, the conversion-table storage unit 133, and the dummy-position storage unit 134, and stores the encrypted character data in the database 110.

The decryption unit 150b acquires encrypted character data from the database 110 in response to a request from the database management unit 120, and decrypts the acquired, encrypted character data by reference to the initial-value storage unit 131, the private-key storage unit 132, the conversion-table storage unit 133, and the dummy-position storage unit 134. Then, the decryption unit 150b passes the decrypted character data to the database management unit 120.

Next, the processing functions of the encryption unit 140b are explained in detail below. In the following explanations, it is assumed that the encryption algorithm is in accordance with DES, and the encryption mode is the CFB mode.

Figure 13:
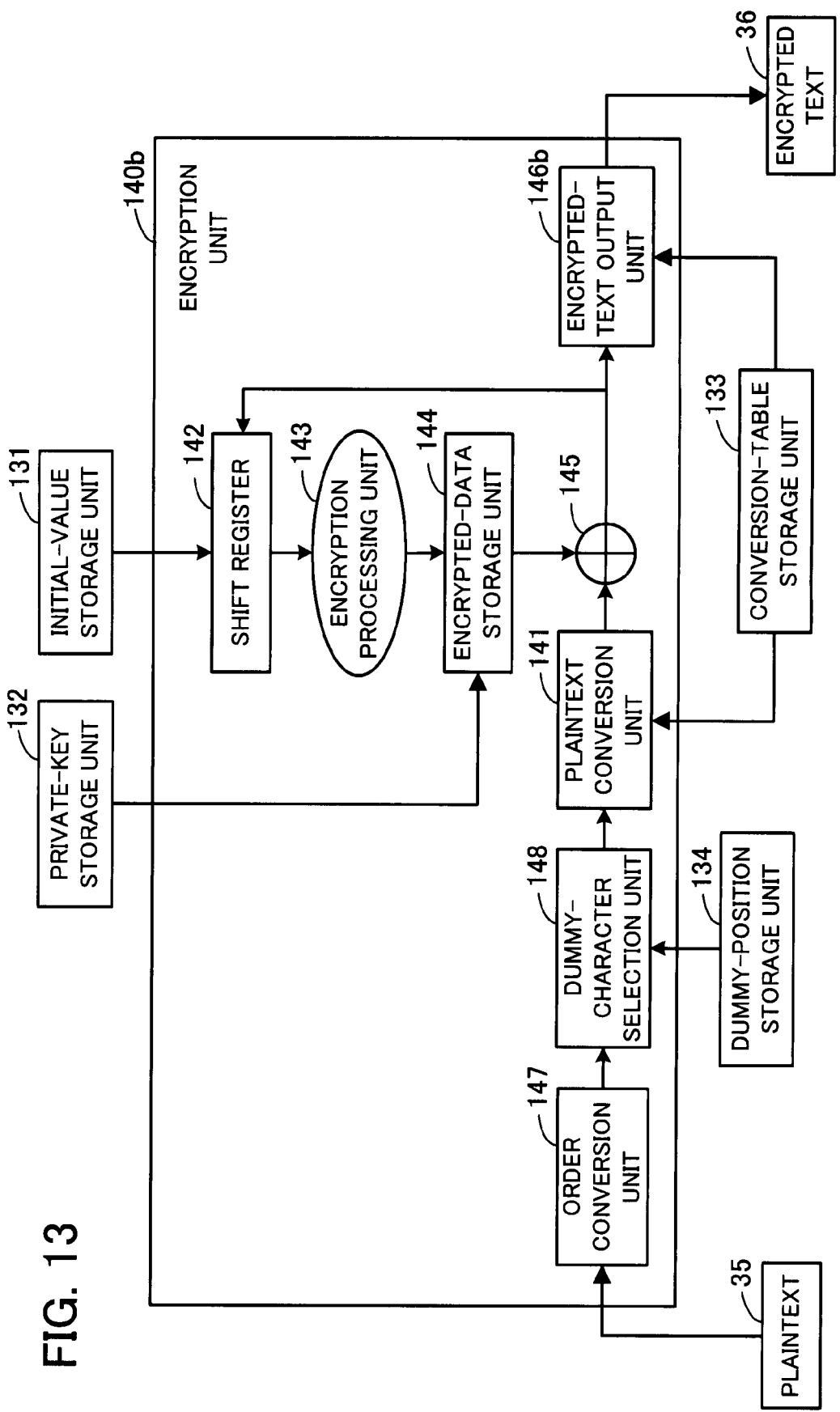
FIG. 13 is a block diagram illustrating examples of functions of an encryption unit in the database system according to the third embodiment.

FIG. 13 is a block diagram illustrating examples of functions of the encryption unit 140b in the database system according to the third embodiment. The encryption unit 140b comprises a plaintext conversion unit 141, a shift register 142, an encryption processing unit 143, an encrypted-data storage unit 144, an EOR calculation unit 145, an encrypted-text output unit 146b, an order conversion unit 147, and a dummy-character selection unit 148. The plaintext conversion unit 141, the shift register 142, the encryption processing unit 143, the encrypted-data storage unit 144, the EOR calculation unit 145 respectively have the same constructions and functions as the corresponding units in the server 100 according to the first embodiment.

When a plaintext 35 is inputted from the database management unit 120 into the order conversion unit 147, the order conversion unit 147 converts the order of the characters constituting the plaintext 35 so as to produce a new plaintext. Specifically, the order conversion unit 147 regards the plaintext 35 as a ring of characters in which the leading character and the tail-end character of the plaintext 35 are chained, and designates a leading character in the ring of characters and the direction in which the characters in the ring are traced, in accordance with a predetermined manner, which is also designated. Thus, it is possible to produce an order-converted character string. The order conversion unit 147 outputs the order-converted character string to the dummy-character selection unit 148.

The dummy-character selection unit 148 acquires the order-converted character string from the order conversion unit 147, refers to the position information stored in the dummy-position storage unit 134, and selects as a dummy character a character which is designated by the position information. Then, the dummy-character selection unit 148 produces a new plaintext by inserting the selected dummy character in the position preceding the leading character of the encrypted text 37, and outputs the new plaintext to the plaintext conversion unit 141.

The encrypted-text output unit 146b acquires from the EOR calculation unit 145 bit sequences of calculation results in succession. The encrypted-text output unit 146b discards the leading bit sequence corresponding to the dummy character inserted by the dummy-character selection unit 148, and converts the remaining bit sequences into character codes, combines the character codes so as to produce an encrypted text 36, and outputs the encrypted text 36.

Figure 14:
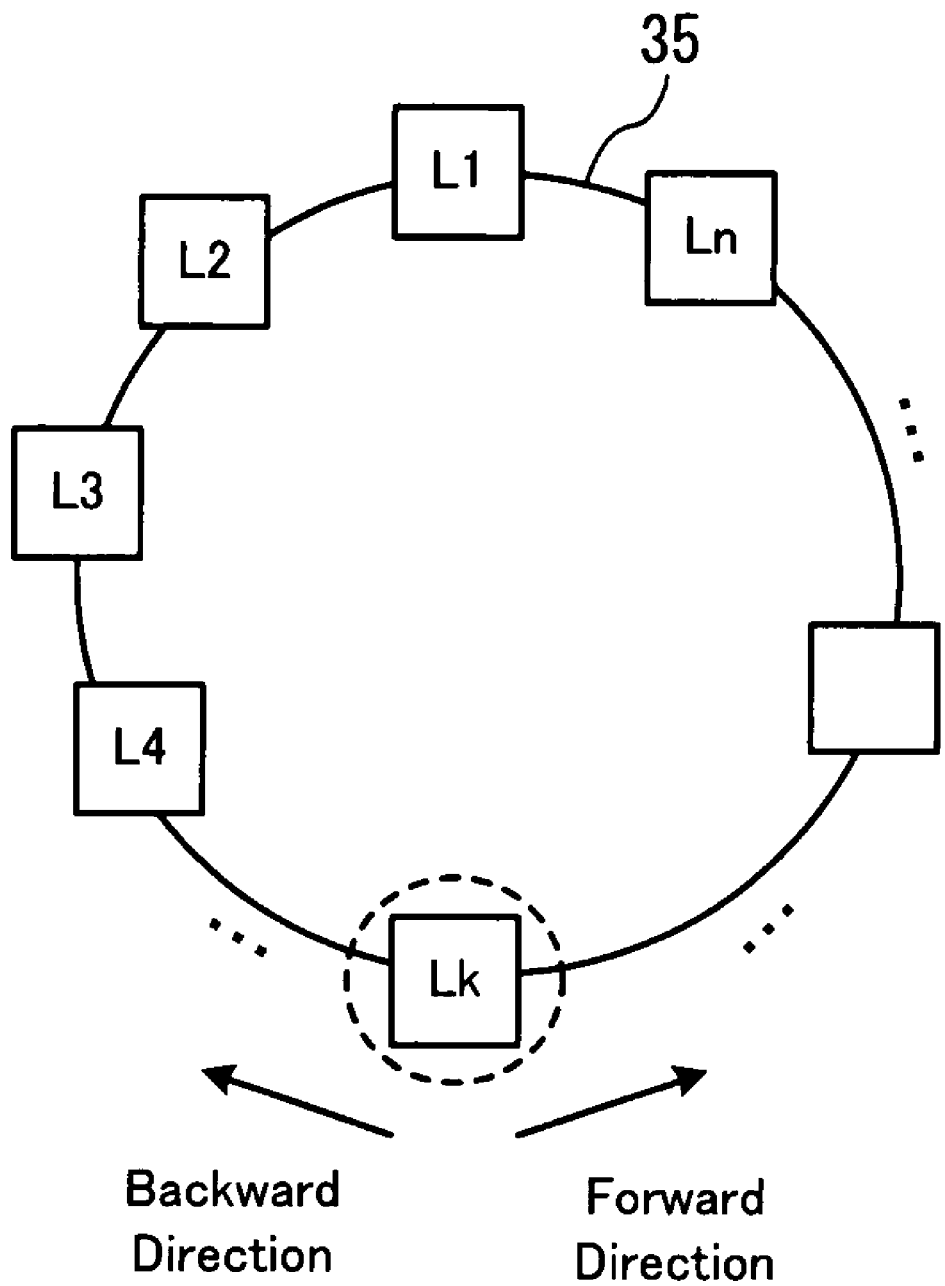
FIG. 14 is a diagram illustrating an outline of the order-conversion processing.

FIG. 14 is a diagram illustrating an outline of the order-conversion processing. The order conversion unit 147 regards the plaintext 35 as a ring of characters as illustrated in FIG. 14. That is, in the case where the plaintext 35 is constituted by n characters (where n is a natural number), the tail-end character Ln is regarded to be chained to the leading character L1 of the plaintext 35. In the example of FIG. 14, the order conversion unit 147 designates the character Lk in the ring as a new leading character (where k is a natural number satisfying $1 \leq k \leq n$) in accordance with a predetermined manner, which is designated.

In addition, the order conversion unit 147 designates the (forward or backward) direction in which the characters following the new leading character Lk in the ring are traced. For example, in the case where the backward direction from the character Lk is designated, a character string Lk, Lk−1, . . . , L1, Ln, . . . , Lk+1 is obtained. Thus, the above order conversion of the characters can reduce the frequency of appearance of character strings having identical leading portions. In addition, since the order conversion is performed by using the rotation in the ring of the characters, the processing for reproducing the order is facilitated.

Figure 15:
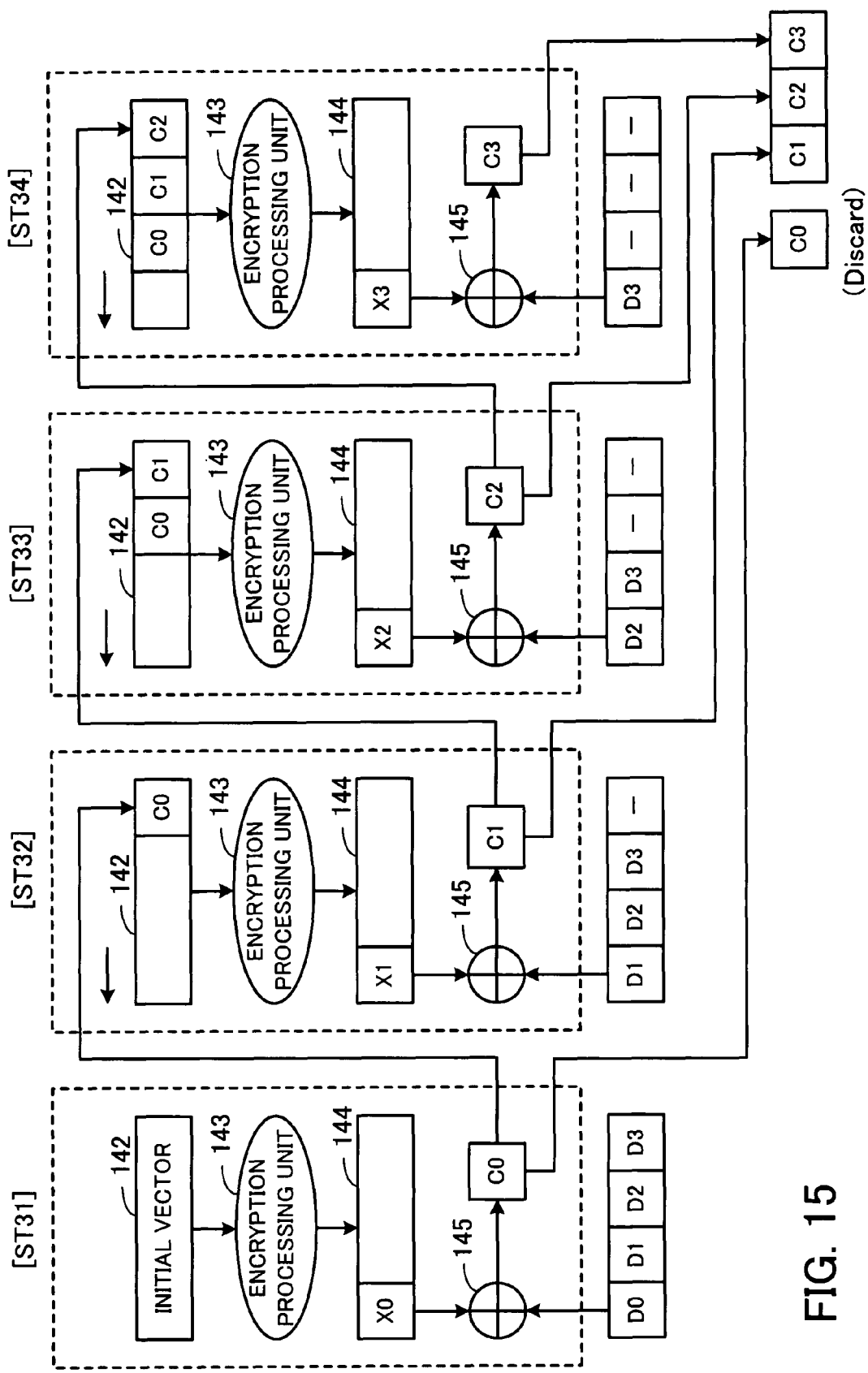
FIG. 15 is a diagram illustrating an example of a sequence of operations for encryption according to the third embodiment.

FIG. 15 is a diagram illustrating an example of a sequence of operations for encryption according to the third embodiment. In the example of FIG. 15, the bit sequences D0, D1, D2, and D3 are encrypted, where the bit sequence D0 corresponds to the dummy character.

In the first step ST31, processing for encryption of the first bit sequence D0 is performed basically in a similar manner to the first embodiment, and a bit sequence C0 is obtained as a calculation result of the encryption of the first bit sequence D0. Then, the bit sequence C0 is discarded by the encrypted-text output unit 146b.

In the second step ST32, processing for encryption of the second bit sequence D1 is performed. At this time, the bit sequence held in the shift register 142 is shifted leftward by the number of bits constituting the bit sequence C0, and the bit sequence C0 is set on the right side of the shifted bit sequence in the shift register 142. Then, a bit sequence C1 is obtained as a calculation result of the encryption of the second bit sequence D1. The bit sequence C1 is handled by the encrypted-text output unit 146b as a bit sequence corresponding to the first character code.

Thereafter, in the third and fourth steps ST33 and ST34, processing for encryption of the third bit sequence D2 and processing for encryption of the fourth bit sequence D3 are successively performed in similar manners, so that the bit sequences C2 and C3 are obtained in the steps ST33 and ST34, respectively. The bit sequences C2 and C3 are handled by the encrypted-text output unit 146b as the bit sequences corresponding to the second and third character codes, respectively.

Since the encryption of a dummy character precedes the encryption of characters to be encrypted as explained above, it is possible to make the encryption of the characters depend on the encryption result of the dummy character.

Next, the functions of the decryption unit 150b are explained below with reference to FIGS. 16 and 17. In the following explanations, it is also assumed that the encryption algorithm is in accordance with DES, and the encryption mode is the CFB mode.

Figure 16:
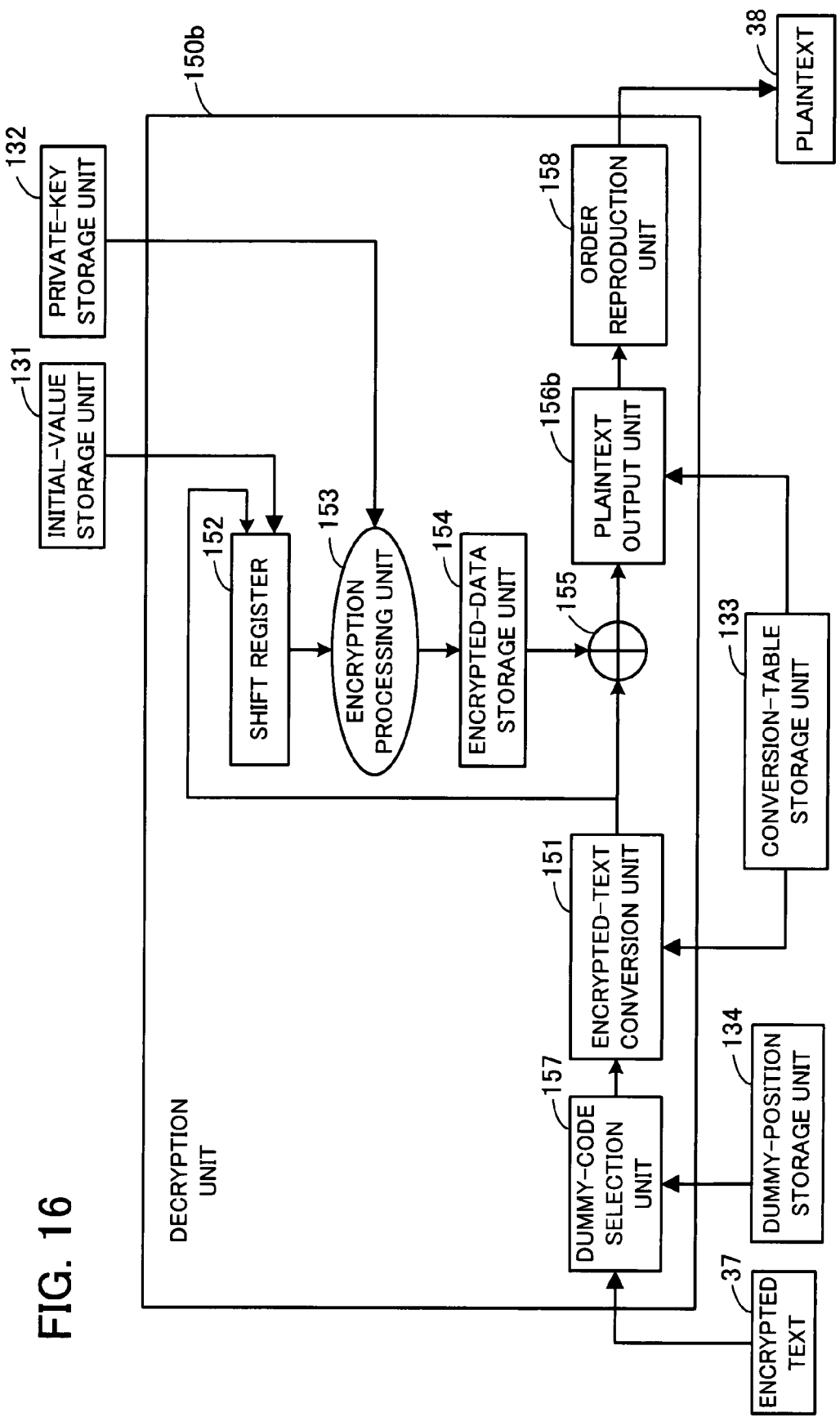
FIG. 16 is a block diagram illustrating examples of functions of a decryption unit in the database system according to the third embodiment.

FIG. 16 is a block diagram illustrating examples of functions of a decryption unit in the database system according to the third embodiment. The decryption unit 150b comprises an encrypted-text conversion unit 151, a shift register 152, an encryption processing unit 153, an encrypted-data storage unit 154, an EOR calculation unit 155, a plaintext output unit 156b, a dummy-code selection unit 157, and an order reproduction unit 158. The encrypted-text conversion unit 151, the shift register 152, the encryption processing unit 153, the encrypted-data storage unit 154, the EOR calculation unit 155 respectively have the same constructions and functions as the corresponding units in the server 100 according to the first embodiment.

When an encrypted text 37 is inputted into the dummy-code selection unit 157, the dummy-code selection unit 157 refers to the position information stored in the dummy-position storage unit 134, and selects as a dummy code an encrypted character designated by the position information. Then, the dummy-code selection unit 157 produces a new encrypted text by inserting the selected dummy code in the position preceding the leading character of the encrypted text 37, and outputs the new encrypted text to the encrypted-text conversion unit 151.

The plaintext output unit 156b acquires from the EOR calculation unit 155 bit sequences of calculation results in succession, and discards the leading bit sequence corresponding to the dummy code inserted by the dummy-code selection unit 157. Then, the plaintext output unit 156b converts the remaining bit sequences into character codes, combines the character codes so as to produce a character string, and outputs the produced character string to the order reproduction unit 158.

The order reproduction unit 158 acquires the character string from the plaintext output unit 156b, inversely converts the order of the characters (which has been converted by the order conversion unit 147 in the encryption unit 140b), so that a plaintext 38 is reproduced. That is, the order reproduction unit 158 regards the acquired character string as a ring of characters in which a leading character and a tail-end character are chained, and performs an operation inverse to the operation performed by the order conversion unit 147. Thereafter, the order reproduction unit 158 outputs the reproduced plaintext 38.

Figure 17:
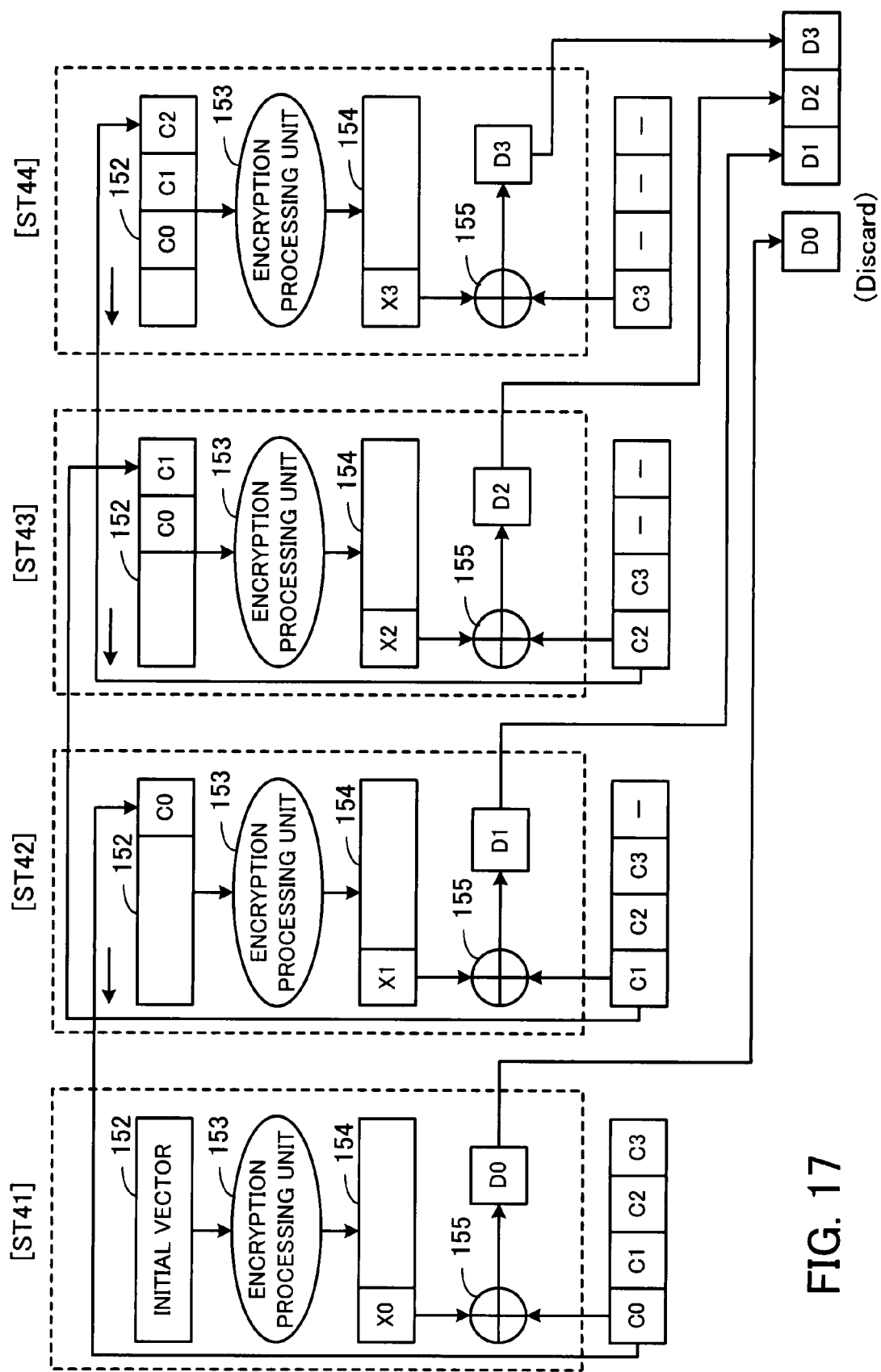
FIG. 17 is a diagram illustrating an example of a sequence of operations for decryption according to the third embodiment.

FIG. 17 is a diagram illustrating an example of a sequence of operations for decryption according to the third embodiment. In the example of FIG. 17, the bit sequences C0, C1, C2, and C3 are decrypted, where the bit sequence C0 corresponds to the dummy code.

In the first step ST41, processing for decryption of the first bit sequence C0 is performed basically in a similar manner to the first embodiment, and a bit sequence DO is obtained as a calculation result of the decryption of the first bit sequence C0. Then, the bit sequence D0 is discarded by the plaintext output unit 156b.

In the second step ST42, processing for decryption of the second bit sequence C1 is performed. At this time, the bit sequence held in the shift register 152 is shifted leftward by the number of bits constituting the bit sequence C0, and the bit sequence C0 is set on the right side of the shifted bit sequence in the shift register 152. Then, a bit sequence D1 is obtained as a calculation result of the decryption of the second bit sequence C1. The bit sequence D1 is handled by the plaintext output unit 156b as a bit sequence corresponding to the first character code.

Thereafter, in the third and fourth steps ST43 and ST44, processing for decryption of the third bit sequence C2 and processing for decryption of the fourth bit sequence C3 are successively performed in similar manners, so that the bit sequences D2 and D3 are obtained in the steps ST43 and ST44, respectively. The bit sequences D2 and D3 are handled by the plaintext output unit 156b as the bit sequences corresponding to the second and third character codes, respectively.

Since the decryption of a dummy code precedes the decryption of characters to be decrypted as explained above, it is possible to decrypt encrypted texts produced by the encryption unit 140b.

When the server 100b according to the third embodiment which performs the above processing for encryption and decryption is used, it is possible to achieve similar advantages to the first embodiment. In addition, in the case where the server 100b is used, even when a great amount of character data which are likely to contain identical leading portions are encrypted, the conversion of the order of the characters can reduce the possibility that the leading portions of the encrypted texts become identical. Further, since the initial vector is updated by the encryption of the dummy character, even if the leading portions of character strings in which the order of the characters are converted become identical, the leading portions of the corresponding encrypted texts do not become identical. Thus, it is difficult to infer about the original character strings from a great number of encrypted texts stored in a database, and it is possible to effectively prevent lowering of the encryption security.

5. Variations

The first to third embodiments may be modified as follows.

(1) Although the encryption algorithm is in accordance with DES in the first to third embodiments, alternatively, any of the other encryption algorithms can be used. In addition, although the encryption mode is the CFB mode in the first to third embodiments, the encryption mode may be any of the other modes such as the CBC (Cipher Block Chaining) mode and the OFB (Output Feedback) mode. In particular, in the first and second embodiments, it is possible to use an encryption mode which does not have a block-chaining function.

(2) Although as many character codes as possible are stored in a region corresponding to a great number of valid bits in the first to third embodiments, it is possible to provide two or more regions corresponding to an identical number of valid bits. For example, when the total number of the character codes stored in the conversion table 133a is 26, the number 26 can also be decomposed as $$26=2^3(8)+2^3(8)+2^3(8)+2^1(2).$$

In the above case, when a character code is converted into a bit sequence to be encrypted or decrypted, information indicating the region in which a correspondence between the character code and an index is indicated is imparted to a subsequent stage, so that the inverse conversion can be easily performed.

(3) Although the number of valid bits is indicated in the conversion table in the first to third embodiments, the number of valid bits may be determined by any of various other manners. For example, the number of valid bits may be automatically determined on the basis of the relative position in the conversion table when encryption or decryption is performed.

6. Recording Medium Storing Program

The processing functions of the server according to each of the first to third embodiments which are explained above can be realized by a computer. In this case, a program describing details of processing for realizing the functions which each server should have is provided. When the computer executes the program, the processing functions of the server can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape (MT), or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

7. Advantages

As explained above, according to the present invention, conversion between the character code and the index is performed before and after encryption by using a conversion table having a plurality of regions in each of which $2^i$ character codes are stored, where i is a natural number. Therefore, it is possible to surely prevent the generation, by encryption, of a bit sequence which is not listed in the conversion table, and therefore easily produce encrypted texts represented by character codes defined in a predetermined character encoding scheme, without complicated processing.

8. Additional Matters

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

In particular, it is possible to realize a database system by using an arbitrary combination of two or more of the features of the first to third embodiments of the present invention explained before.

What is claimed is:

1. A non-transitory computer-readable medium storing an encryption program causing a computer to operate as:
    a conversion-table storage unit which stores a conversion table having a plurality of regions each of which stores $2^i$ character codes associated with index values, where i is a natural number predetermined for each of the plurality of regions, the index values have a minimum necessary bit length for uniquely identifying the $2^i$ character codes within each of the plurality of regions, the plurality of regions are defined by decomposing a total number of character codes included in a character encoding scheme into a sum of components of $2^i$, and each character code included in the character encoding scheme is allocated to any one of the plurality of regions;

a plaintext conversion unit which acquires a first plaintext inputted into the computer, and converts first character codes constituting the first plaintext into first index values associated with the first character codes, respectively, by reference to first ones, storing the first character codes, of the plurality of regions of said conversion table stored in said conversion-table storage unit, where the first character codes are defined in said predetermined character encoding scheme;

an encryption unit which successively acquires said first index values, and encrypts the first index values into encrypted values having respectively identical bit lengths to the first index values; and an encrypted-text output unit which successively acquires said encrypted values, converts the encrypted values into second character codes respectively associated with index values identical to the encrypted values by reference to said first ones of the plurality of regions of the conversion table, produces a sequence of the second character codes as a first encrypted text corresponding to said first plaintext, and outputs the first encrypted text.

2. A non-transitory computer-readable medium according to claim 1, wherein said encryption unit generates each of said encrypted values by encrypting values held in a register so as to generate a bit sequence, cutting out a portion of the bit sequence having an identical bit length to one of said first index values corresponding to said each of the encrypted values, and performing a predetermined calculation on the basis of said one of the first index values and the portion of the bit sequence, where initial values are stored in advance in the register.

3. A non-transitory computer-readable medium according to claim 2, wherein said encryption unit parallelly generates ones of the encrypted values corresponding to ones of said first index values by cutting out a plurality of portions of the said bit sequence having respectively identical bit lengths to the ones of the first index values after the bit sequence is generated.

4. A non-transitory computer-readable medium according to claim 1, wherein character codes of characters which more frequently appear in plaintexts are preferentially stored in one or more of the plurality of regions which can store a greater number of character codes if the plurality of regions can store different numbers of character codes.

5. A non-transitory computer-readable medium according to claim 1, causing the computer to further operate as:

an encrypted-text conversion unit which acquires a second encrypted text inputted into the computer, and converts third character codes constituting the second encrypted text into second index values associated with the third character codes, respectively, by reference to second ones, storing the third character codes, of the plurality of regions of the conversion table stored in said conversion-table storage unit, where the third character codes are defined in said predetermined character encoding scheme;

a decryption unit which successively acquires said second index values, and decrypts the second index values into decrypted values having respectively identical bit lengths to the second index values; and a plaintext output unit which successively acquires said decrypted values, converts the decrypted values into fourth character codes associated with index values identical to the decrypted values by reference to said second ones of the plurality of regions of the conversion table, produces a sequence of the fourth character codes as a second plaintext corresponding to said second encrypted text, and outputs the second plaintext.

6. An encryption process comprising:

storing, in advance in a conversion-table storage unit, a conversion table having a plurality of regions each of which stores $2^i$ character codes associated with index values, where i is a natural number predetermined for each of the plurality of regions, the index values have a minimum necessary bit length for uniquely identifying the $2^i$ character codes within each of the plurality of regions, the plurality of regions are defined by decomposing a total number of character codes included in a character encoding scheme into a sum of components of $2^i$, and each character code included in the character encoding scheme is allocated to any one of the plurality of regions;

acquiring a plaintext inputted into the computer, and converting first character codes constituting the plaintext into index values associated with the first character codes, respectively, by reference to ones, storing the first character codes, of the plurality of regions of said conversion table stored in said conversion-table storage unit, where the first character codes are defined in said predetermined character encoding scheme;

successively acquiring said index values, and encrypting the index values into encrypted values having respectively identical bit lengths to the index values; and successively acquiring said encrypted values, converting the encrypted values into second character codes respectively associated with index values identical to the encrypted values by reference to said ones of the plurality of regions of the conversion table, producing a sequence of the second character codes as an encrypted text corresponding to said plaintext, and outputting the encrypted text.

7. An encryption device comprising:

a conversion-table storage unit which stores a conversion table having a plurality of regions each of which stores $2^i$ character codes associated with index values, where i is a natural number predetermined for each of the plurality of regions, the index values have a minimum necessary bit length for uniquely identifying the $2^i$ character codes within each of the plurality of regions, the plurality of regions are defined by decomposing a total number of character codes included in a character encoding scheme into a sum of components of $2^i$, and each character code included in the character encoding scheme is allocated to any one of the plurality of regions;

a plaintext conversion unit which acquires a plaintext inputted into the computer, and converts first character codes constituting the plaintext into index values associated with the first character codes, respectively, by reference to ones, storing the first character codes, of the plurality of regions of said conversion table stored in said conversion-table storage unit, where the first character codes are defined in said predetermined character encoding scheme;

an encryption unit which successively acquires said index values, and encrypts the index values into encrypted values having respectively identical bit lengths to the index values; and an encrypted-text output unit which successively acquires said encrypted values, converts the encrypted values into second character codes respectively associated with index values identical to the encrypted values by reference to said ones of the plurality of regions of the conversion table, produces a sequence of the second character codes as an encrypted text corresponding to said plaintext, and outputs the encrypted text.

* * * * *